US010632518B2

(12) United States Patent
Bouey et al.

(10) Patent No.: US 10,632,518 B2
(45) Date of Patent: Apr. 28, 2020

(54) PIPE END FORMING METHODS AND PIPE CLAMP

(71) Applicant: CORE Linepipe Inc., Calgary (CA)

(72) Inventors: Samuel Glen Bouey, Calgary (CA); Dave Sheehan, Cremona (CA); David McLeod, Cochrane (CA); David McColl, Calgary (CA); Kevin Gartner, Calgary (CA); Brian Bonner, Cochrane (CA)

(73) Assignee: CORE LINEPIPE INC., Calgary (CA)

( * ) Notice: Subject to any disclaimer, the term of this patent is extended or adjusted under 35 U.S.C. 154(b) by 617 days.

(21) Appl. No.: 15/319,667

(22) PCT Filed: Jun. 16, 2015

(86) PCT No.: PCT/CA2015/050556
§ 371 (c)(1),
(2) Date: Dec. 16, 2016

(87) PCT Pub. No.: WO2015/192237
PCT Pub. Date: Dec. 23, 2015

(65) Prior Publication Data
US 2017/0129001 A1 May 11, 2017

Related U.S. Application Data

(60) Provisional application No. 62/012,797, filed on Jun. 16, 2014.

(51) Int. Cl.
B21D 41/02 (2006.01)
F16L 13/02 (2006.01)
(Continued)

(52) U.S. Cl.
CPC ........... *B21D 41/02* (2013.01); *B21D 41/025* (2013.01); *B21D 41/026* (2013.01); *B21K 25/00* (2013.01);
(Continued)

(58) Field of Classification Search
CPC .... B21D 41/025; B21D 41/02; B21D 41/026; B21K 1/10; B21K 1/12; B21K 25/00
See application file for complete search history.

(56) References Cited

U.S. PATENT DOCUMENTS 2,918,239 A  12/1959  Wirth
3,466,738 A   9/1969  Mount
(Continued)

FOREIGN PATENT DOCUMENTS

CA  1103430 A   6/1981
CA  1111234 A  10/1981
(Continued)

OTHER PUBLICATIONS

International Search Report and Written Opinion issued by the Canadian Intellectual Property Office as International Searching Authority for International Application No. PCT/CA2015/050556 dated Sep. 11, 2015 (15 pages).
(Continued)

Primary Examiner — Pradeep C Battula
(74) Attorney, Agent, or Firm — Wilmer Cutler Pickering Hale and Dorr LLP

(57) ABSTRACT

Methods for forming a pipe end for a pipe having an inner surface lined with a liner are provided, wherein the pipe is cut at an axial location to provide a first end having an initial inner diameter defined by an inner surface of the pipe; and a length of the pipe is expanded from the first end to form an upset, bell end where an inner diameter of the upset, bell end is larger than the initial diameter, thereby defining an
(Continued)

annulus between the inner surface of the pipe and the liner. A clamp for limiting a pipe's movement during various operations is also provided.

10 Claims, 33 Drawing Sheets

(51) Int. Cl.
*B21K 25/00* (2006.01)
*F16L 13/14* (2006.01)
*F16L 58/18* (2006.01)
*F16L 19/028* (2006.01)
*F16L 19/04* (2006.01)
*F16L 47/03* (2006.01)

(52) U.S. Cl.
CPC ......... *F16L 13/0236* (2013.01); *F16L 13/141* (2013.01); *F16L 13/146* (2013.01); *F16L 19/028* (2013.01); *F16L 19/04* (2013.01); *F16L 58/181* (2013.01); *F16L 47/03* (2013.01)

(56) References Cited

U.S. PATENT DOCUMENTS

| | | | |
|---|---|---|---|
| 3,907,335 A | 9/1975 | Burge et al. | |
| 4,139,142 A | 2/1979 | Maple et al. | |
| 4,627,146 A * | 12/1986 | Ward | B21D 39/04 285/382.1 |
| 5,127,116 A | 7/1992 | Greig | |
| 5,634,672 A | 6/1997 | Stack et al. | |
| 6,036,235 A * | 3/2000 | Anderson | F16L 15/006 285/383 |
| 6,260,401 B1 | 7/2001 | Tada | |
| 6,536,717 B2 | 3/2003 | Parker | |
| 8,113,814 B2 | 2/2012 | Padmanabhan et al. | |
| 2009/0320953 A1* | 12/2009 | Fletcher | B32B 1/08 138/148 |
| 2012/0193909 A1 | 8/2012 | Minich et al. | |
| 2016/0116080 A1 | 4/2016 | Bouey et al. | |

FOREIGN PATENT DOCUMENTS

EP 0141680 A2 5/1985
WO WO-2013/120201 A1 8/2013

OTHER PUBLICATIONS

NOV Tuboscope Zap-Lok Technology, "Fast Pipeline Construction," retrieved online from URL:<http://zap-lok.businesscatalyst.com/index.html> and URL:<http://zap-lok.businesscatalyst.com/overview.html> 3 pages (retrieved on Feb. 27, 2015).

* cited by examiner

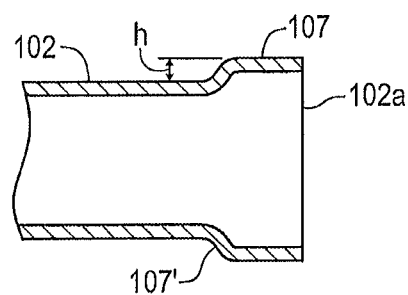
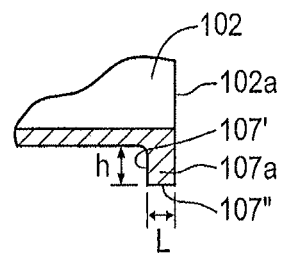
FIG. 2A  FIG. 2B
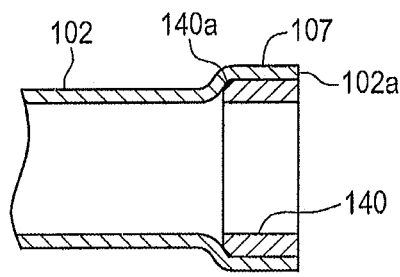
FIG. 2C
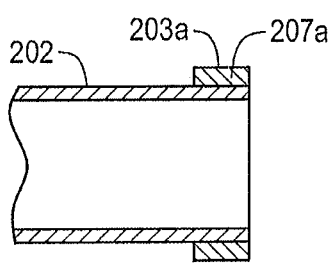
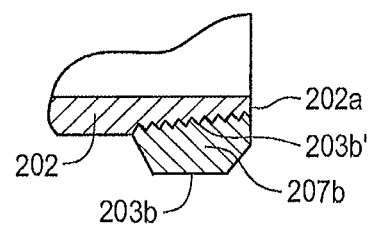
FIG. 2D  FIG. 2E

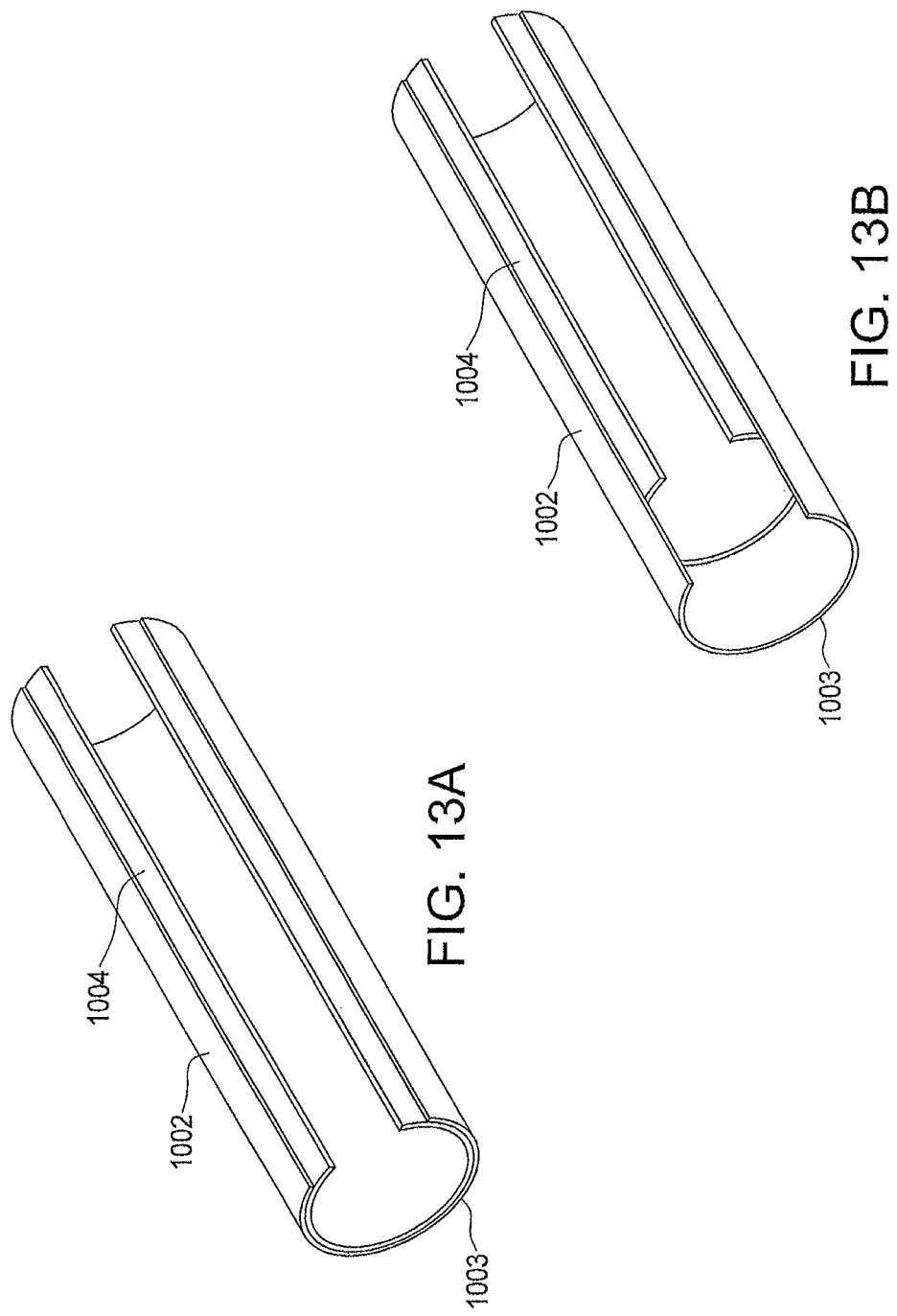

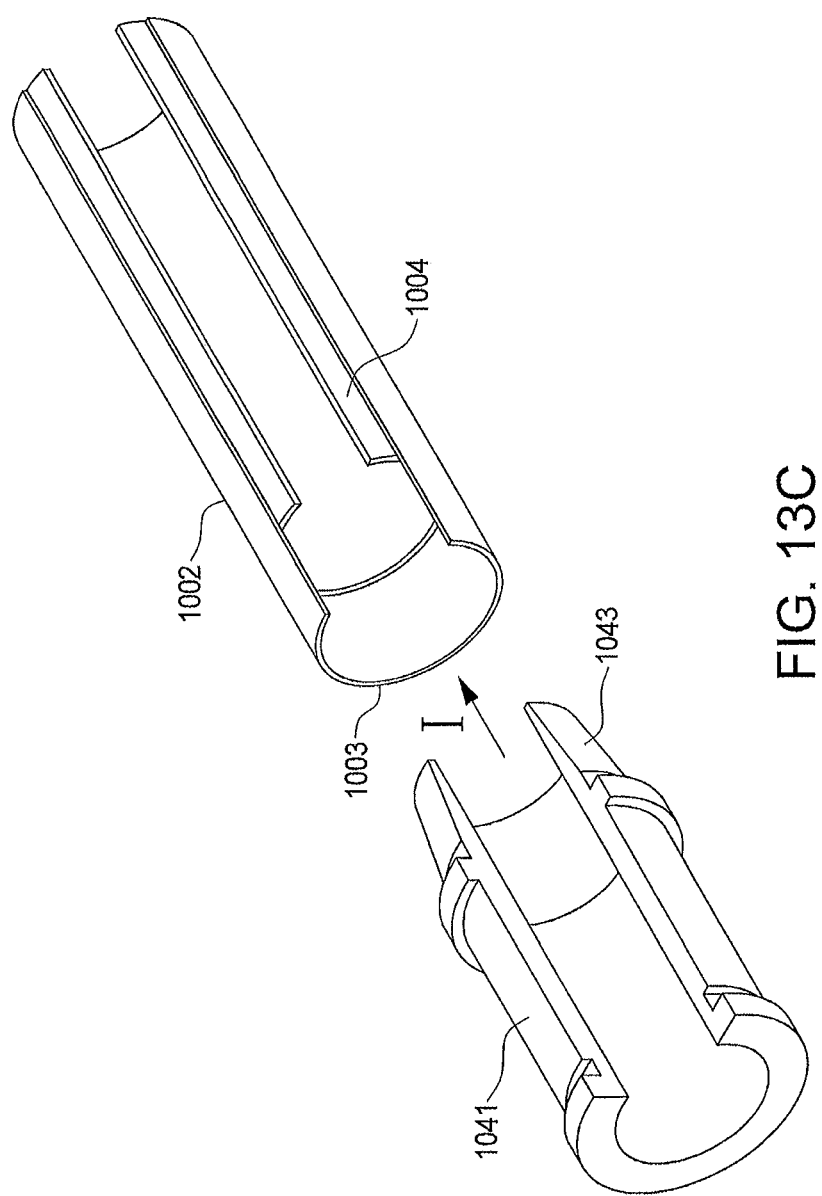

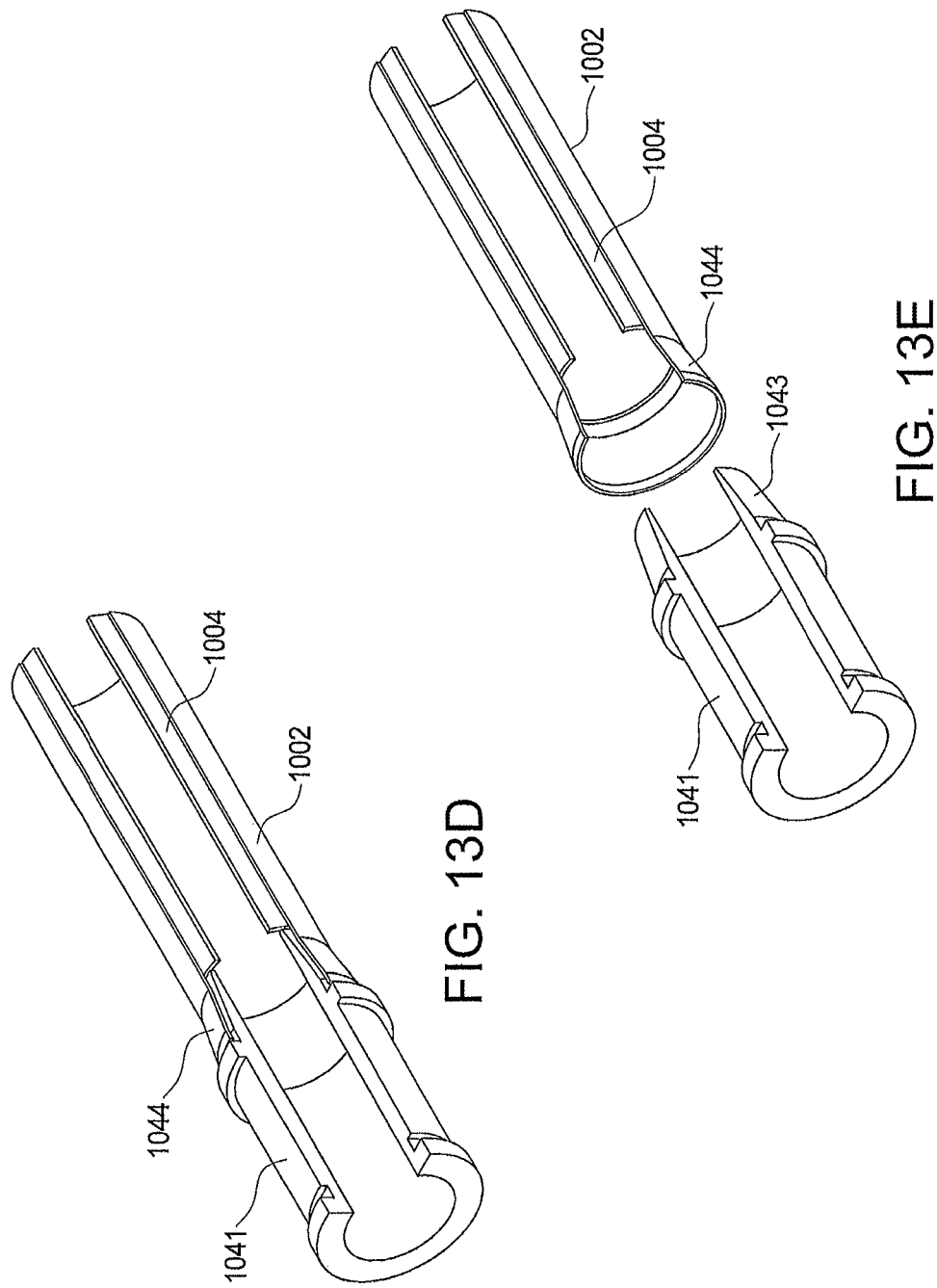

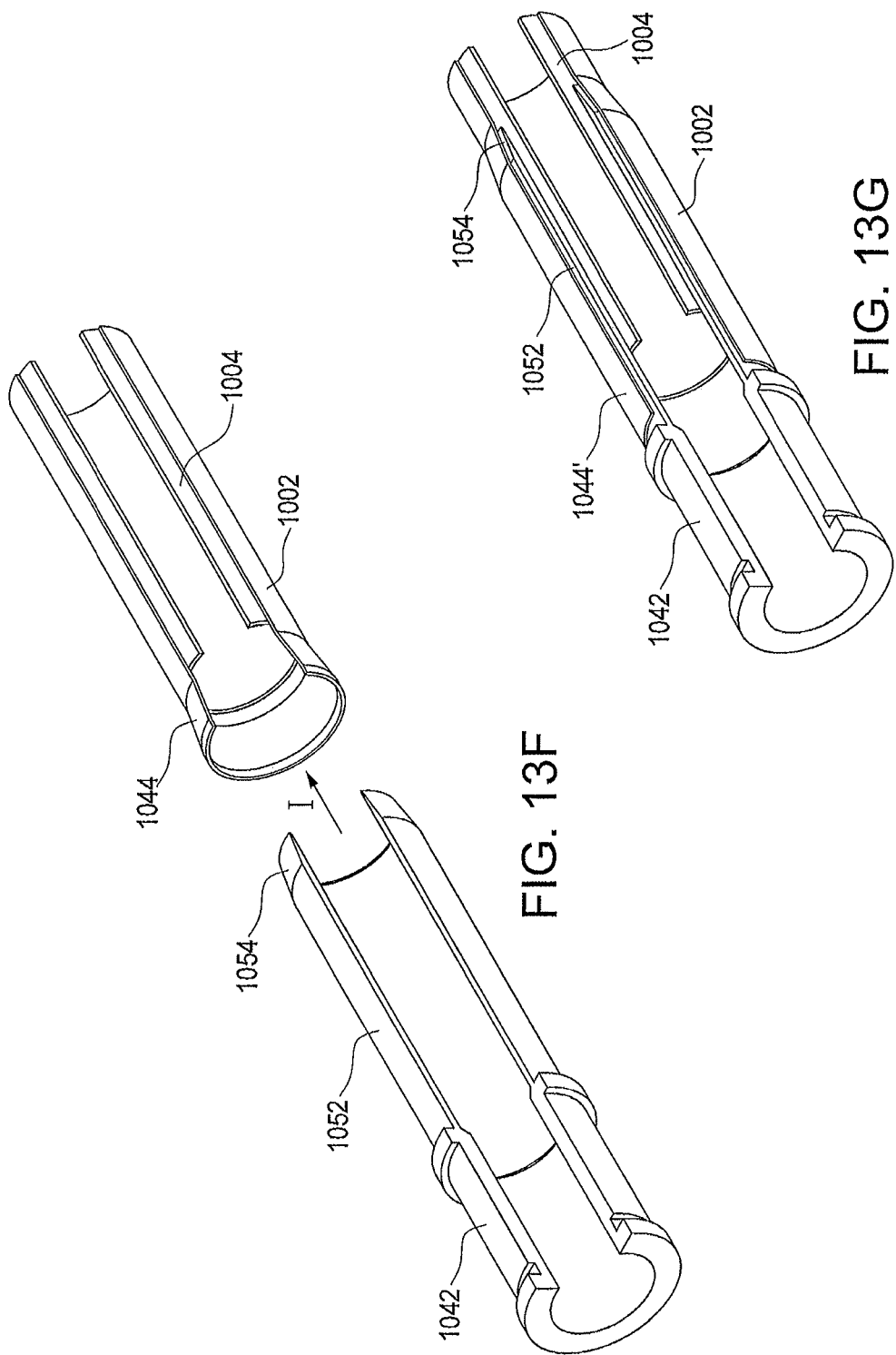

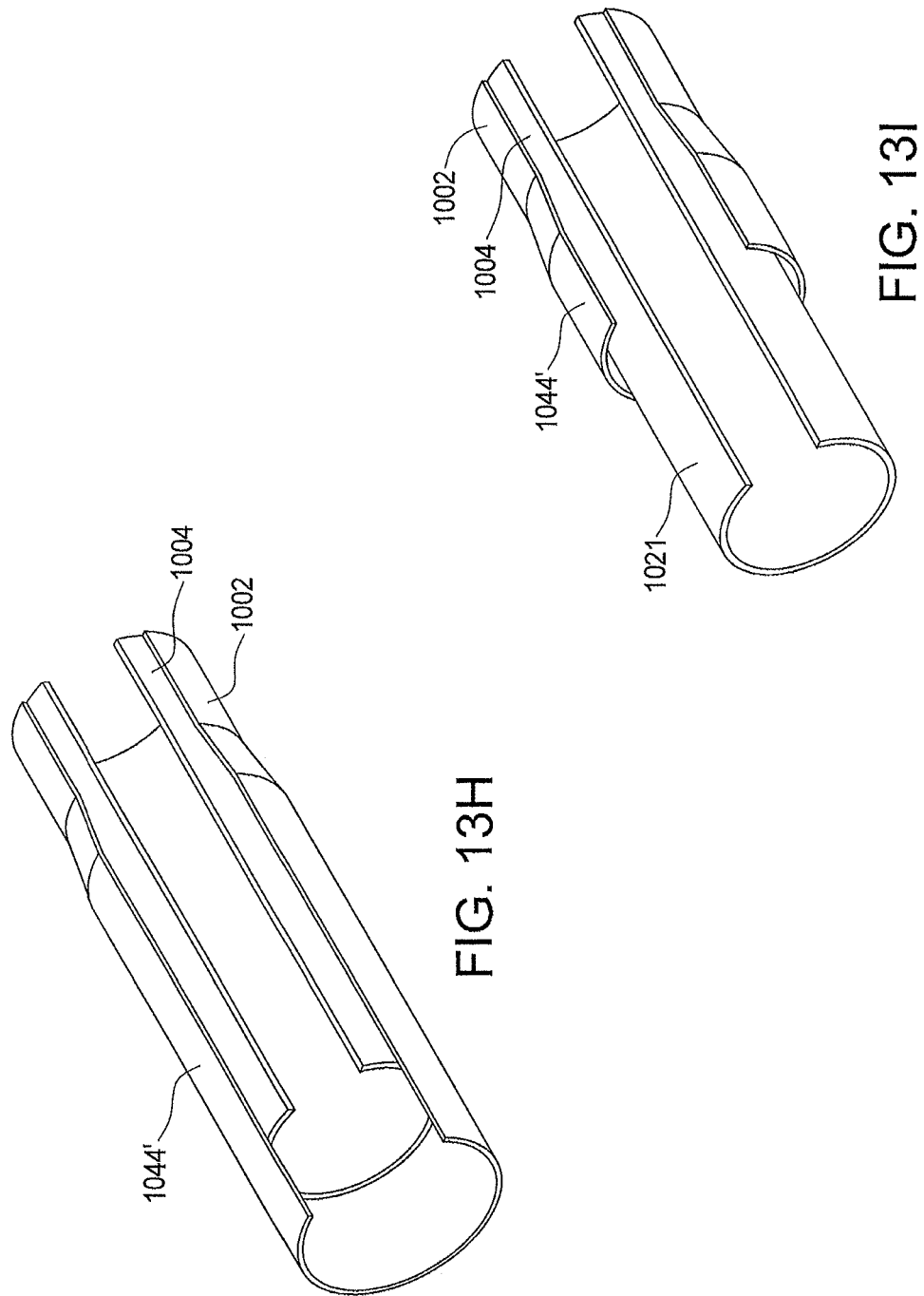

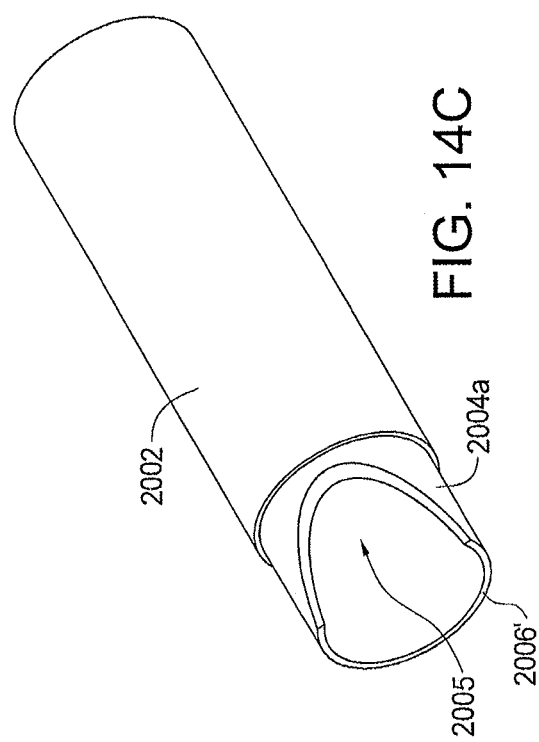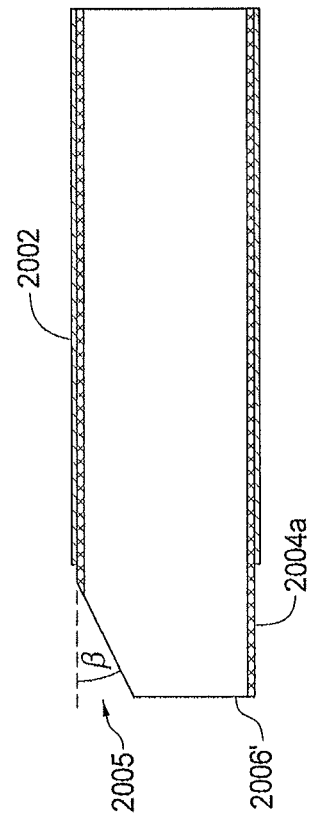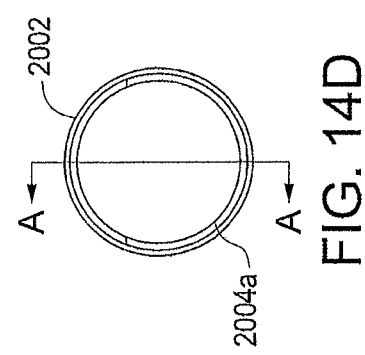

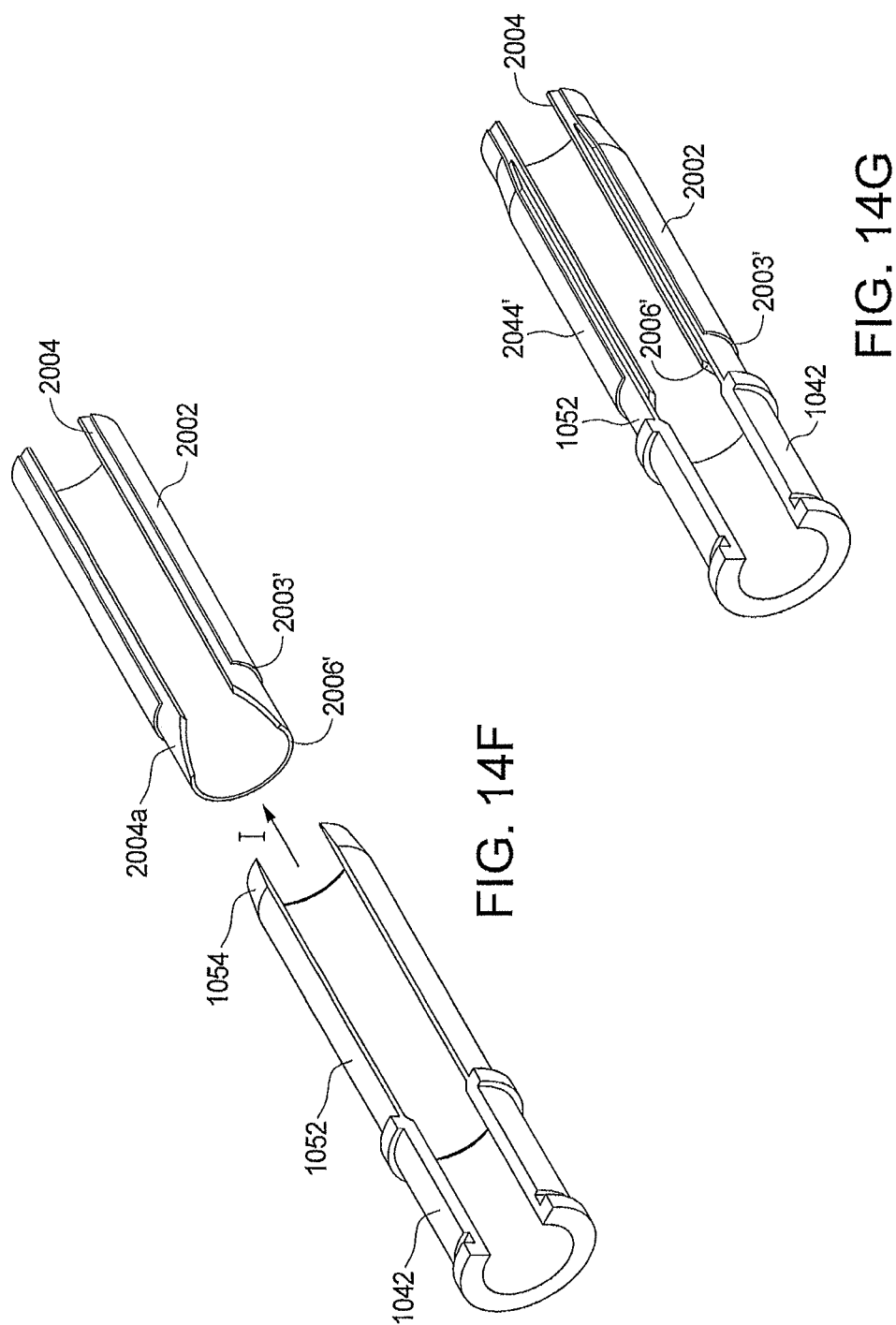

PIPE END FORMING METHODS AND PIPE CLAMP

CROSS-REFERENCE TO RELATED APPLICATIONS

The present application is a national stage application of International Application No. PCT/CA2015/050556 entitled "Pipe End Forming Methods and Pipe Clamp," filed on Jun. 16, 2015, which claims the benefit of priority U.S. Application No. 62/012,797, filed on Jun. 16, 2014, the disclosures of which are incorporated herein in their entirety by reference thereto.

FIELD OF THE INVENTION

The present invention relates methods for forming pipe ends for pipe connection and equipment and method for securing pipe, particularly for forming pipe ends.

BACKGROUND OF THE INVENTION

Pipelines are needed for conveying fluids such as water, oil effluent, natural gas, carbon dioxide or mining slurries some of which may be pressurized.

Thin walled metal pipes offer an advantage in terms of facilitated handling and reduced material costs, however, have proven difficult to connect in a reliable and efficient manner.

It is desirable that the pipeline system be resistant to internal corrosion and/or abrasion that may shorten the useful life of the pipeline. Sometimes, the fluids transported within the pipeline may corrode or abrade metal pipe materials where many plastic materials exhibit superior resistance to these effects.

It has become common to repair corroded or abraded pipelines by pulling significant lengths of a plastic liner through an existing metal pipe that is already installed and has been in service. New pipeline systems can also be constructed in the same manner.

This construction method requires many expensive steps including the in-field construction of a metal pipeline, construction of a separate plastic pipeline and then the process of inserting the long length of plastic pipeline into the metal pipeline.

SUMMARY OF THE INVENTION

The present invention relates to a pipeline system for conveying fluids and, in particular, to a pipe connection assembly, equipment, and methods, methods for forming pipe ends for pipe connection, and equipment and method for securing pipe, particularly for forming pipe ends.

In accordance with one aspect of the present invention, there is provided a pipe connection assembly comprising: a first pipe section and a second pipe section, each of the first pipe section and the second pipe section including: a metal tube having a length, an inner surface defining an inner diameter, an outer surface, and a wall thickness defined by the distance between the inner surface and the outer surface; and a pipe coupling for mechanically engaging the first pipe section to the second pipe section, the pipe coupling formed as a cylindrical tube and including a first tubular end configured to mechanically engage the first pipe section and a second tubular end configured to mechanically engage the second pipe section.

In accordance with another aspect of the present invention, there is provided a pipe connection assembly comprising: a first pipe section and a second pipe section, each of the first pipe section and the second pipe section including: a metal tube having a length, an inner surface defining an inner diameter, an outer surface, and a wall thickness defined by the distance between the inner surface and the outer surface, and a plastic liner within the metal tube, the plastic liner formed of a plastic material compatible with electro-fusion and having a length and an inner bore; a pipe coupling for connecting between the first pipe section and the second pipe section; and, an electro-fusion assembly including: a plastic sleeve; an electrical conductor supported by the plastic sleeve; and an electrical contact for conducting electricity to the electrical conductor, the electrical contact exposed at the outer surface of the metal coupling shell.

In accordance with another aspect of the present invention, there is provided a method for pipeline construction comprising: joining a first pipe section to a second pipe section by mechanically engaging a pipe coupling to a first metal tube of the first pipe section and mechanically engaging the pipe coupling to a second metal tube of the second pipe section.

In accordance with another aspect of the present invention, there is provided a pipe section for construction of a pipeline comprising: a metal tube having a length, an inner surface, an outer surface, and a wall thickness defined by the distance between the inner surface and the outer surface, the metal tube having a bell end wherein the bell end has an inner diameter greater than a normal inner diameter along a portion of the metal tube adjacent the bell end; and a plastic liner formed of a plastic material compatible with electro-fusion, the plastic liner having a length, an inside diameter and an outer diameter substantially equal to the normal inner diameter, the plastic liner being positioned within the metal tube with a portion of the plastic liner extending into the bell end with an annulus formed between the plastic liner and the bell end.

In accordance with another aspect of the present invention, there is provided an electro-fusion assembly installed in a metal shell, the electro-fusion assembly including: a plastic sleeve within the metal shell; an electrical conductor supported by the plastic sleeve; an electrical contact for conducting electricity to the electrical conductor, the electrical contact exposed on an outer surface of the metal shell; and a fluid tight seal and an electrically insulative liner between the contact and the metal shell.

In accordance with another aspect of the present invention, there is provided a method for forming a pipe end for a pipe lined with a liner, the method comprising: making a cut at an axial location of the pipe and the liner to define a first end of the pipe having an initial inner diameter, the cut being on a plane substantially perpendicular to a long central axis of the pipe; and expanding a length of the pipe from the first end to form an upset, bell end where the inner diameter of the pipe is enlarged over the initial diameter, thereby defining an annulus between the inner surface of the pipe and the liner.

In accordance with another aspect of the present invention, there is provided a method for forming a pipe end for a pipe having an inner surface lined with a liner, the method comprises: cutting the pipe at an axial location to provide a first end having an initial inner diameter defined by an inner surface of the pipe; cutting back the pipe from the first end to define a receded first end and to provide an exposed length of the liner beyond the receded first end; and expanding a length of the pipe from receded first end to form an upset, bell end where an inner diameter of the upset, bell end is larger than the initial diameter, thereby defining an annulus between the inner surface of the pipe and the liner.

In accordance with yet another aspect of the present invention, there is provided a clamp for securing a pipe having an outer surface, the clamp comprising: a cover comprising: (i) an elongated sleeve with a first lengthwise side, a second lengthwise side, and an inner surface defining an opening for receiving a portion of the outer surface of the pipe, the opening having an arc, and the widest part of the opening defining a first plane; and (ii) a side flange extending laterally outwardly from each of the lengthwise sides, the side flange having a base surface; and a base comprising: (i) an elongated sleeve with a first lengthwise side, a second lengthwise side, and an inner surface defining a trough for receiving a portion of the outer surface of the pipe, the trough having an arc, and the widest part of the trough defining a second plane; and (ii) a side flange extending laterally outwardly from each of the lengthwise sides, the side flange having a top surface, wherein (i) the base surface is tilted away from the opening direction of the opening, thereby defining an angle between the base surface and the first plane; and/or (ii) the top surface is tilted away from the opening direction of the trough, thereby defining an angle between the top surface and the second plane; a bore is defined by the inner surfaces of the sleeves when the cover is placed over the base; and the flanges of the cover and the flanges of the base are connectable when the cover is placed over the base.

According to another embodiment of the present invention, there is provided a method for limiting axial and/or lateral movement of a pipe, the method comprising: placing a lower portion of a length of the pipe in a trough defined by an inner surface of an elongated sleeve of a base, the elongated sleeve having a lengthwise central axis and lengthwise sides, the lengthwise central axis of the pipe being substantially aligned with the lengthwise central axis of the base sleeve, the trough having an arc and a widest part thereof defining a second plane, the base further comprising a side flange extending laterally outwardly from each of the lengthwise sides, the side flange having a top surface; placing a cover over the base, such that an upper portion of the length of the pipe is covered by an opening defined by an inner surface of an elongated sleeve of the cover, the elongated sleeve having a lengthwise central axis and lengthwise sides, the lengthwise central axis of the pipe being substantially aligned with the lengthwise central axis of the cover sleeve, the opening having an arc and a widest part thereof defining a first plane, the cover further comprising a side flange extending laterally outwardly from each of the lengthwise sides, the side flange having a base surface, wherein (i) the base surface is tilted away from the opening direction of the opening, thereby defining an angle between the base surface and the first plane; and/or (ii) the top surface is tilted away from the opening direction of the trough, thereby defining an angle between the top surface and the second plane; and pressing the flanges of the cover and the flanges of the base together to render the base surface in substantial contact with the top surface and to narrow the arc of either or both of the opening and the trough.

BRIEF DESCRIPTION OF THE FIGURES

Referring to the figures wherein like reference numerals indicate similar parts throughout the several views, several aspects of the present invention are illustrated by way of example, and not by way of limitation, in detail in the figures, wherein:

FIGS. 1A to 1E are sometimes referred to herein collectively as FIG. 1.

FIGS. 2A to 2E are cross sections of end portions of metal pipes useful in a pipe connection. These figures are sometimes referred to herein collectively as FIG. 2.

FIGS. 3A to 3G are sometimes referred to herein collectively as FIG. 3.

FIGS. 13A to 13J are partially cut-away perspective views showing various steps in a first process for forming a pipe end, similar to that shown in FIGS. 7 and 10. These figures are sometimes referred to herein collectively as FIG. 13.

FIGS. 14A, 14B, and 14F to 14I are partially cut-away perspective views showing various steps in a second process for forming a pipe end, similar to that shown in FIGS. 7 and 10. FIG. 14C is a perspective view showing one of the steps in the second process. FIG. 14D is an end view of the pipe shown in FIG. 14C. FIG. 14E is a cross-sectional view of the pipe shown in FIG. 14D, along line A-A. These figures are sometimes referred to herein collectively as FIG. 14.

DETAILED DESCRIPTION

Figure 1A:
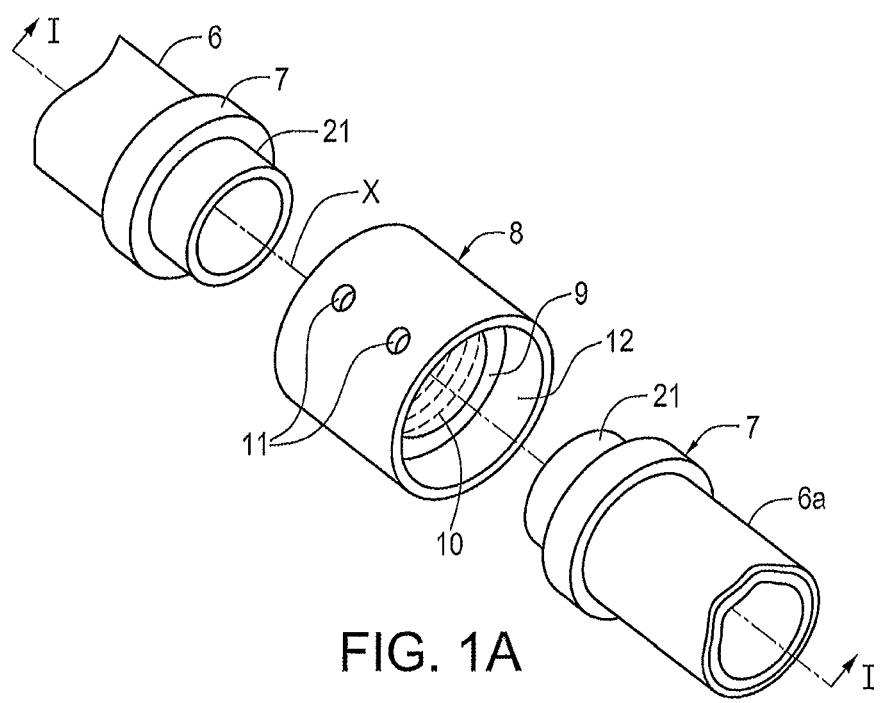
FIG. 1A is a perspective, exploded view of a pipe connection showing the ends of two discrete lengths of plastic lined metal pipe and a coupling for joining the plastic lined metal pipe.

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The pipeline, the pipe connection and the method each employ a length of metal pipe. In some embodiments, the metal pipe is unlined with the metal wall creating the inner diameter through which fluids are conveyed. In some other embodiments, the metal pipe includes a metal shell with a plastic liner and the plastic liner contains fluids being conveyed.

A pipeline may be constructed by joining multiple sections of the metal pipe with a connection between the metal of adjacent pipes. In embodiments employing a plastic liner, the pipeline includes a sealed connection between the liners of adjacent pipes.

Embodiments Employing Plastic Lined Metal Pipe

The disclosure that follows focuses on embodiments employing plastic lined metal pipe. Thus, the pipe connections have an outer metal shell and a plastic liner within the outer metal shell. The liner behaves as a bladder within the metal shell.

The plastic liner need not carry any of the structural loading associated with containing a pressurized fluid, since the metal shell of the pipe and the metal-to-metal connection between pipes serves that purpose. The liners of connected pipes are connected directly or indirectly to form a reliable seal to cause the liners to act as a fluid containment bladder.

The pipes may be joined directly or indirectly with a metal-to-metal connection.

A pipe coupling, including a metal shell and an electro-fusion assembly may be employed to provide the metal-to-metal connection and/or the liner-to-liner seal. The pipe coupling may be a component separate from the pipes to be connected or the pipe coupling may be formed or connected onto an end of one of the pipes forming the pipe connection. If a coupling is used in the pipe connection, the metal-to-metal connection may be through the metal shell of the coupling and/or the liner-to-liner seal may be completed through a plastic element of the electro-fusion assembly.

One embodiment of a pipe connection is shown in FIGS. 1A to 1E. The illustrated pipe connection includes a first pipe 6 and a second pipe 6a connected end to end via a pipe coupling 8.

Each pipe 6, 6a includes a metal pipe 2 and an inner plastic liner 4 within the metal pipe. Pipe coupling 8 includes a metal shell 12 and an electro-fusion assembly within metal shell 12. The electro-fusion assembly includes a plastic sleeve 9 fusable to the inner plastic liner and an electrical conductor 10 capable of generating heat to melt plastic sleeve 9 and liners 4 so that the material of these parts can fuse and create a fluid tight seal at the interfaces of liners 4 and sleeve 9. The electrical conductor extends helically about an axial length of the plastic element 9 and it is along this axial length that electro-fusion occurs.

The pipe connection further has a metal-to-metal connection through the mechanical engagement of metal pipes 2 with metal shell 12. Mechanical connection methods are preferred over welding, since welding requires very high temperatures that can melt the plastic liner. Welding is also uncertain in the field, as the quality of a weld can be dependent on environmental conditions and the capabilities of the welder. The use of mechanical connection methods can avoid these problems and offer a more reliable end result. The mechanical engagement of metal pipe 2 to metal shell 12 can occur in many ways for example, employing a shear connection. In one embodiment, for example, the parts can be threaded together. In another embodiment, the parts 2, 12 are plastically deformed into engagement. In yet another embodiment, the parts may be clamped into mechanical engagement. Which means of mechanical engagement is employed may depend on the wall thickness of the metal pipe 2 and/or shell 12, the ability to form them, costs, the need for secondary containment of leaks past the liner, etc.

One embodiment of a plastic lined metal pipe is shown in FIGS. 1A to 1E. In the illustrated embodiment, for example pipe 6 includes: inner plastic liner 4 formed as a tube and having an outer surface and an inner surface defining an inner pipe diameter; and, metal pipe 2, also formed as a tube and having an inner facing surface adjacent (i.e. spaced from, in contact with or bound to) the outer surface of the plastic liner 4 and an outer surface defining an outer pipe diameter. The plastic liner 4 extends along the axis of the metal pipe and extends beyond the end 2a of metal pipe 2 providing an extension 21. Extension 21 may be present only at one end of the pipe or at both ends of the pipe. Extension 21 is sized to have a length selected to overlap the axial length spanned by conductor 10, when pipe is properly inserted in a coupling. There may be a coating 5 on the outer surface of the metal pipe 2.

Plastic liner 4 can be corrosion and/or abrasion resistant to the fluid to be conveyed therein. The plastic liner may include any material compatible with an electro-fusion process such as for, for example, thermoplastics. Suitable materials include, for example: high density polyethylene (HDPE), nylon and polypropylene (PP). The plastic liner can be uniform throughout or layered with any combination of plastic materials as long as the material exposed on the surface to be fused, in this embodiment the outer surface, is a thermoplastic material that is compatible with electro-fusion and the surface to be exposed to the fluid conveyed in the pipeline is resistant to breakdown by that fluid. In one embodiment, the plastic liner is a laminate. The laminate layers may be co-extruded, if desired. In one laminate, HDPE is employed as outermost layer and is the material to be electro-fused and a thin layer of another plastic, such as nylon, is employed on the inside to offer greater durability in the fluid to be conveyed. The inner facing plastic may, for example, be a thermoplastic material categorized as "advanced" or "high performance" and may have better resistance to the chemical(s) to be conveyed through the pipe and/or may be less permeable to gases than the HDPE.

Pipe 6 may be a discrete length having one or both ends that are formed to be connected together to form a pipeline. Discrete lengths can be appropriate for handling and transportation. The plastic liner can be installed in metal pipe 2 in the factory during the manufacturing process or in the field.

In some embodiments, the metal pipe wall thickness may be 0.250 inches or less, although the methods described herein are also useful with pipes of wall thickness greater than 0.250 inches. Metal pipe 2 may be formed of any durable metal such as aluminum, a steel, etc., but most often is formed of a steel.

Figure 1B:
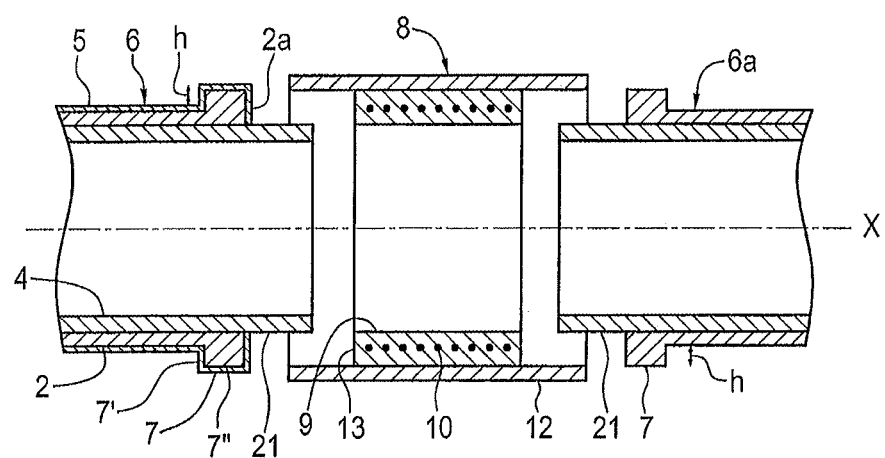
FIG. 1B is a cross section taken along line I-I of FIG. 1A.

One or both ends 2a of the discrete length of metal pipe 2 have a configuration for accepting mechanical engagement to an adjacent pipe. In the embodiment of FIG. 1B, for example, end 2a of metal pipe 2 includes an upset on the outer surface, herein a retaining flange 7, formed as an axis symmetrical protrusion extending radially outward from the outer surface of the pipe. The retaining flange creates a shoulder 7' of height h between the outer surface and the radial outer surface 7" of the retaining flange. Retaining flange 7 may have an axial length along radial outer surface 7" equal to or greater than the wall thickness of the metal pipe 2. The retaining flange 7 may be formed in various ways.

For example, with reference to FIGS. 2A and 2B, a retaining flange 107, 107a may be formed through plastic deformation of the end 102a of a metal pipe 102. These retaining flanges, while having a different shape, each define a shoulder 107' with a height h. Because flange 107a is formed as an outwardly flared portion of end 102a, flange 107a has an axial length L along its radial outer surface 107" that is about the same as the wall thickness of the metal pipe.

FIG. 2C shows a metal pipe 102 configured for increasing the load capacity of the retaining flange 107. Metal pipe 102 includes an insert 140 installed, as by pressing, inside the expanded area of metal pipe 102 that forms retaining flange 107. Insert 140 is a continuous ring that provides hoop strength against flange 107 being crushed inwardly. Retaining flange 107 is formed by outwardly expanding, as by plastic deformation, end 102a, as in FIG. 2A. Insert 140 has an outside diameter selected to have a slight interference fit with the inside diameter of the expanded area of the metal pipe forming the retaining flange. To facilitate installation of insert 140, the leading edge of the outside surface of the insert 140 may have a bevel 140a with a taper selected to fit within and expand the retaining flange without axially buckling it. Insert 140 is secured within the retaining flange to prevent the insert from being ejected out of the retaining flange under loading. This can be achieved with the friction created by an interference fit or by using an adhesive or by means of a mechanical lock such as a set screw or other methods. Insert 140 may be formed of any material capable of withstanding the inwardly directed stresses to be placed upon it when a force is applied against flange 107. The insert is normally made of metal and its desirable that it have the strength of steel. The wall thickness and material properties for the insert 140 can be selected to provide the stiffness and strength required for the loads.

In another embodiment of the invention, and referring to FIGS. 2D and 2E, on one or both ends of the discrete length of metal pipe 202 is an axis symmetrical protrusion forming a flange 207a, 207b extending outward from the outer surface of metal pipe 202. The flange in these embodiments is formed by attaching a metal ring 203a, 203b to the outer surface of the pipe at the pipe's end. The metal ring may be attached to the outer surface of metal pipe 202 with a thread 203b', a friction, shrink fit or a plastic deformation fit between ring 203a and pipe 202 or other means. Where a friction, shrink or plastic deformation are employed, the outer surface receiving the ring may be formed to accept that connection by roughening, grooving, forming teeth, etc.

The cross sectional profile of the metal ring may vary. For example, it may have a sharply angled front face and rear shoulder 207a' and/or a beveled front face and shoulder 207b'. The outer facing radial surface may be cylindrical, smooth, faceted, grooved, roughened, teethed or contoured.

For example, one or more grooves may be machined into one or more of the outer surfaces of the flange to facilitate installation of an elastomeric seal such as an o-ring.

If a thread is used to secure the ring, as in FIG. 2E, the thread may be machined into the outer surface of the metal pipe and the inner surface of the ring. The thread on the pipe may extend from end face 202a along a length of the axis of the pipe.

Figure 3A:
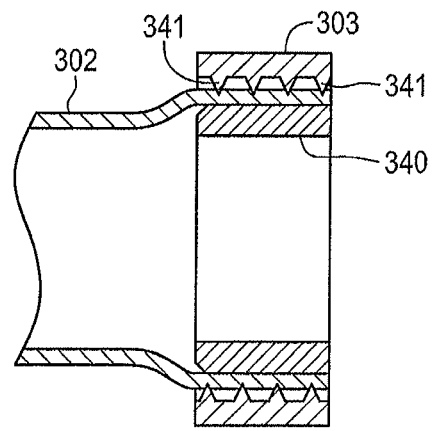
FIGS. 3A to 3C are cross sections of end portions of further metal pipes useful in a pipe connection.
Figure 3B:
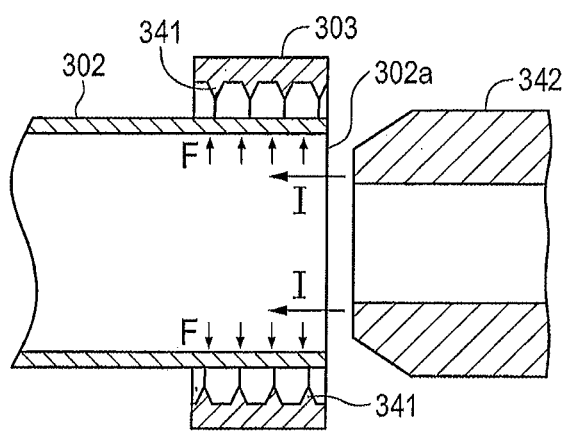
Figure 3C:
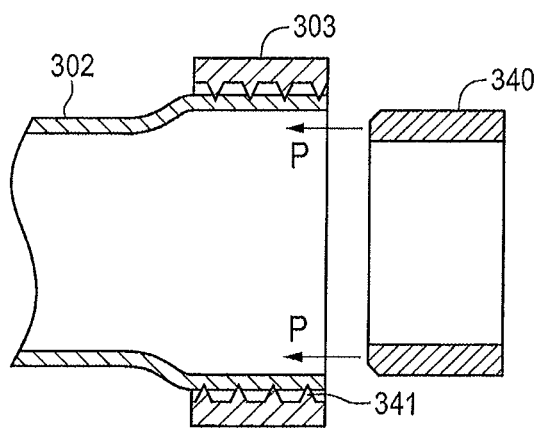

FIG. 3A shows another metal pipe 302 useful in the present invention. FIGS. 3B and 3C show a method for attaching a metal ring 303 to the outside of a metal pipe 302 by means of plastic deformation of the metal pipe. This method forms a shear connection between the metal ring and the metal pipe. The resulting attachment is similar to a machined pipe thread in that it utilizes the shear strength of the metal material to transfer load. However, the attachment shown in FIGS. 3A, 3B and 3C has several advantages over a connection employing a machined pipe thread: it is less expensive to manufacture; it is stronger because pipe wall material is not removed; it will perform better for sealing fluid because of the metal-to-metal interface between the ring and the pipe has a high contact pressure (this metal-to-metal seal can be formed on a rough, uneven or out-of-round outer pipe surface); it does not require precise alignment of the metal ring and pipe as would be required to prevent cross threading of machined threads; it will work even for thin walled metal pipe where machined threads cannot provide sufficient strength.

Figure 3D:
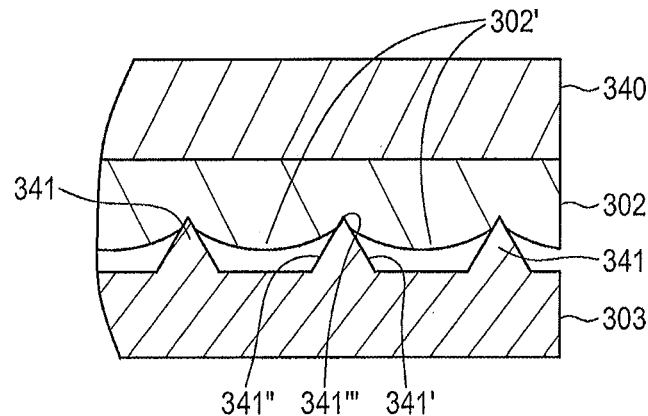
FIG. 3D is an enlarged cross section through a final joint.

FIG. 3A shows that metal ring 303 employed for this preparation has a plurality of protrusions, called teeth 341, extending inwardly from the inside surface of the metal ring. In some embodiments, the teeth may extend annularly with each tooth extending circumferentially about the ring inner circumference in a continuous manner. The distance across the inside surface of the ring defines a minor diameter at the inner most point between facing teeth and a major diameter at the base of the teeth where they merge with the inner surface of the metal ring body. The teeth are spaced axially along the inner surface of the metal ring. The distance between teeth in the axial direction is called the pitch P (FIG. 3D). Further aspects of the teeth are described below.

As shown in FIG. 3B, before installation, the minor diameter of ring 303 is larger than the outer diameter OD of metal pipe 302.

To secure ring 303 to pipe 302, the metal pipe is expanded radially outward, arrows F, and pressed into engagement with teeth 341 on the metal ring. This expansion will deform the metal pipe beyond its elastic limit. The tips of the teeth that first come into contact with the expanding metal pipe will create a localized high contact pressure and will penetrate and embed into the outer surface of the expanding metal pipe. The profile of the teeth, wall thickness of the metal ring and the material strength of the metal ring are selected to optimize this embedment for maximum shear strength of the attachment. The portions 302' of the pipe 302 not in contact with the teeth 341 deform and flow into the spaces between the teeth (FIG. 3D). The height H1 of the teeth (half the difference between the minor and major diameter) and the pitch is selected to optimize this deformation for maximum shear strength of the attachment. The overall length of the metal ring and the number of teeth is selected with a length over diameter ratio, such as greater than 0.75, to ensure that the attachment of the metal ring is sufficiently stable under various types of loading such as bending moment.

FIG. 3B shows how metal pipe 302 may be expanded with a swage 342. Swage 342 is pushed, arrows I, into open end 302a of the pipe and applies a force, arrows F, that plastically deforms the metal wall of pipe 302 out. The taper on the swage is a sufficiently low angle, such as less than about 10°, to expand the pipe without axially buckling it.

If desired, a metal insert 340 may subsequently be pressed into the expanded pipe (FIG. 3C). For example, when the swage 342 is removed the expanded metal pipe may "spring back" or deform inward slightly after it is expanded. This may cause teeth 341 to be dislodged or "un-embedded". The "spring back" is due to the elastic behavior of metal. Alternately or in addition, when ring 303 is placed under operational loading, the forces may compress the metal pipe radially inward allowing the teeth to be dislodged or "un-embedded" and the ring may lose the shear connection with pipe 302.

These problems can be remedied by installation of metal insert 340. Metal insert 340 fits tightly inside the expanded inner diameter of pipe 302 and supports the metal pipe to prevent the "spring back" ensuring that the shear interface is maintained between ring 303 and pipe 302.

Metal insert 340 is similar to the insert 140 described above in FIG. 2C. Metal insert 340 is installed, arrows P, with a slight interference fit with the inside diameter of the expanded metal pipe. The interference may result from the elastic "spring back" of the expanded metal pipe or variances in dimensional tolerances. The leading edge of the outside surface of the metal insert may have a bevel with a taper selected to expand the metal pipe without axially buckling it. The wall thickness and material properties for the metal insert are selected to provide the additional hoop stiffness and strength to ensure that the shear interface is maintained under loading. With ring 303 attached to pipe 302 and the optional metal insert in place, the pipe is ready to accept a metal-to-metal engagement in a pipe connection.

Figure 3E:
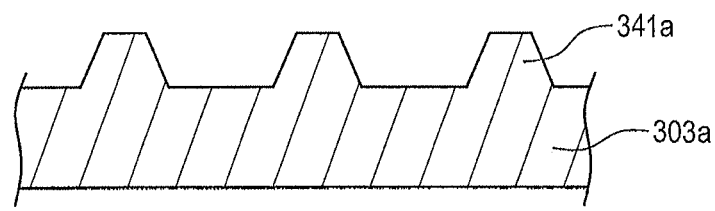
FIGS. 3E to 3G are cross sections showing possible teeth profiles.
Figure 3F:
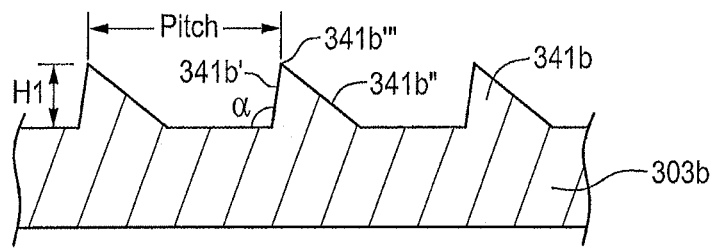
Figure 3G:
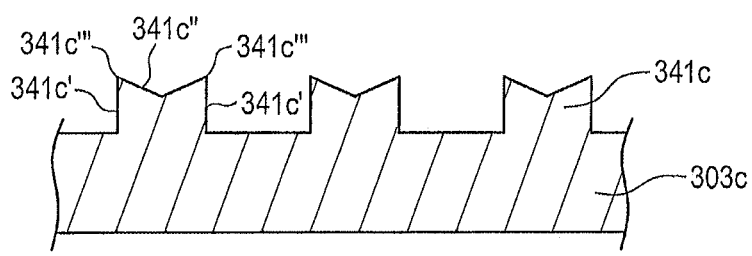

As noted above, the teeth have a profile which is the cross sectional shape therethrough. The illustrated teeth 341 best seen in FIG. 3D have a single, sharp tip and are symmetrically formed wherein the first side flank 341' and the second side flank 341" angle away from the tip 341'" toward the valleys at approximately the same angle. However, other forms are possible such as teeth 341a with a blunt tip such as shown in FIG. 3E. In some cases, a tooth may be asymmetrically formed relative to the tip. For example, as shown in FIG. 3F, the teeth 341b on ring 303b may each have a tip 341b'", a first flank surface 341b' extending from the tip towards the valley between adjacent teeth and a second flank surface 341b" extending down on the other side of the tip. The first flank surface is more steeply angled than the second flank surface. For example, in the illustrated embodiment the first tooth face 341b' is cut substantially radially at about +/−5° from an orthogonal reference extending radially from the long axis of ring 303b. Stated another way, the first tooth face may extend at angle α of 85°-95° from the long axis of the ring on which the tooth is formed. FIG. 3G shows another tooth form with teeth 341c on ring 303c. Teeth 341c each have two tips 341c'" and asymmetrical flanks relative to the tips, with outer facing flanks 341c' being steeper than middle flanks 341c".

The teeth may be formed to facilitate engagement of the material of the pipe. In one embodiment, asymmetrical teeth such as teeth 341b and 341c may provide a stronger connection than other forms when the steeper tooth face is directed toward the insertion direction, such as arrows P (FIG. 3C), of the insert. Thus, for example, in FIG. 3C teeth 341 on ring 303, if formed asymmetrically, may have a steeper face on the side facing toward the direction from which ring 340 is pressed into the end of the pipe. With the steeper flank facing in a direction opposite the insertion direction of arrows P, the teeth tend to bite into the metal of pipe 302, rather than allowing the metal pipe to slide over and/or bend down the teeth: the sharper sides of the tips tend to dig into the pipe and resist slippage of the metal pipe over the teeth. A ring that has asymmetrical teeth facing in only one direction may be installed with consideration as to the direction of installation of the insert. However, a ring such as ring 303c having asymmetrical teeth with steep flanks facing in both axial directions may be used in any configuration since one of the steep flanks will face toward the insert. Alternately, a ring such as ring 303b might have further teeth in addition to teeth 341b with the steep flank facing in the other direction.

Of course, in addition to the installation of insert, the teeth may operate to counter operational load: the forces tending to pull the connection apart. Thus, the orientation of teeth may be considered in this respect as well and, again, a ring such as ring 303c having asymmetrical teeth with steep flanks facing in both axial directions or a ring such as ring 303b with further teeth in addition to teeth 341b with the steep flank facing in the other direction, may be useful.

While rings can include one tooth, a plurality of teeth spaced axially apart as shown provides redundancy and lowers the shear stress per tooth.

The tooth material, and likely the material of the entire ring, has a yield strength or hardness equal to or greater than the material to be engaged.

To form a pipe connection, pipes are connected by a pipe coupling that may be separate or a component of one of the pipes. The pipe coupling completes the connection between adjacent pipes by (i) providing mechanical engagement between the metal pipes of the pipes and (ii) providing the electro-fusion assembly. The pipe coupling can take various forms.

In one embodiment, a pipe coupling 8 is employed that connects two pipes by crimping. Pipe coupling 8 includes metal shell 12 and the electro-fusion assembly. Outer metal coupling shell 12 is formed as a tube having an inner surface and an outer surface defining an outer diameter. There may be a coating bonded to the outer surface of the metal coupling shell 12.

The electro-fusion assembly includes inner plastic coupling sleeve 9 within the shell. Sleeve 9 is formed as a tube and includes an inner surface defining an inner diameter, an outer surface and a wall thickness between the inner surface and the outer surface. Electrical conductor 10 is supported by the sleeve. In this embodiment, electrical conductor 10 is embedded in the wall thickness of sleeve 9, but it may be on the inner surface of sleeve. The electrical conductor extends about a circumference of the sleeve in a helical pattern and extends an axial length over which the electro-fusion process is conducted. Electrical conductor 10 generates heat when an electrical power source is applied to it. This heat melts the material of sleeve and nearby meltable parts to permit fusion thereof when the electrical power, and thereby heat, is discontinued. At least a pair of contacts 11 is exposed on the outer surface of coupling 12 and are electrically in contact with the electrical conductor 10 for connecting an electrical power source to the electrical conductor 10. While the contacts are exposed on the exterior surface of the coupling, they must be electrically insulated from the metal shell in order to properly conduct electricity to the conductor 10.

Since metal shell 12 may have ports required to allow contacts 11 to connect with conductor 10 through the metal shell, it may be desirable to provide a fluid tight seal between each contact and the shell in the ports. A fluid tight seal between each contact and shell 12 may provide secondary containment against release of leaked fluids, if that is of interest.

At both ends of the pipe coupling, the metal coupling shell 12 extends along its axis past the end of the plastic coupling sleeve 9. The plastic coupling sleeve has a shorter length than sleeve 12 and is recessed from the ends of shell 12. Thus, a step 13 is formed between the inner surface of sleeve 9 and the inner surface of shell 12. In this embodiment, step 13 is formed by the wall thickness of sleeve 9. The step 13 can assist with assembly to ensure proper advancement of the pipe into the coupling and to resist axial compression of the pipe connection once it is made up.

Figure 4:
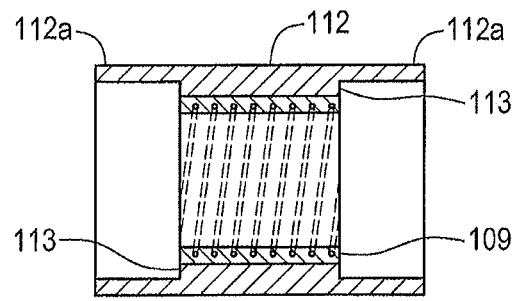
FIG. 4 is a cross section of a crimp coupling.

Other embodiments are possible, for example, with reference to FIG. 4, another pipe coupling is shown where step 113 is formed in part of material of the shell 112, which may be stronger to resist more efficiently axial compressive forces across the connection. The inner surface of the metal coupling shell 112 is stepped having a smaller diameter in the portion that is in contact with plastic coupling sleeve 109 than the exposed portion at ends 112a. The transition in diameter forms a circumferential step face which is substantially flush with the end face of the plastic coupling sleeve 109 and together the step face and the end face form step 113. The diameter transition can be formed by machining the inner surface of the metal coupling shell to form shoulder face, by inserting a metal sleeve inside the metal coupling shell, by expanding and plastically deforming the metal coupling shell, etc.

To make a pipe connection, one end of each of the plastic lined metal pipes 6 is inserted axially into an end of the pipe coupling 8. The insertion and connection process is the same for each pipe, although they may be connected one at a time and possibly one in the factory (called a mill end connection) and one in the field. Thus, the insertion of only one pipe is described in detail, the other pipe being inserted in a similar manner. If the electro-fusion of both liners occurs at the same time, only one set of contacts may be employed to energize the entire length of the conductor. However, if the electro-fusion occurs in stages, for example, one liner is fused to the sleeve and later the second liner is fused to the sleeve, two sets of contacts may be required. One set of contacts is used to energize a first length of conductor and the second set of contacts is used to energize a second length of conductor. The contacts may be positioned adjacent an end of the coupling, such that they are positioned external to the fused area of liner to shell. Thus, they do not offer a leak path through the final, fused plastic liner.

Figure 1C:
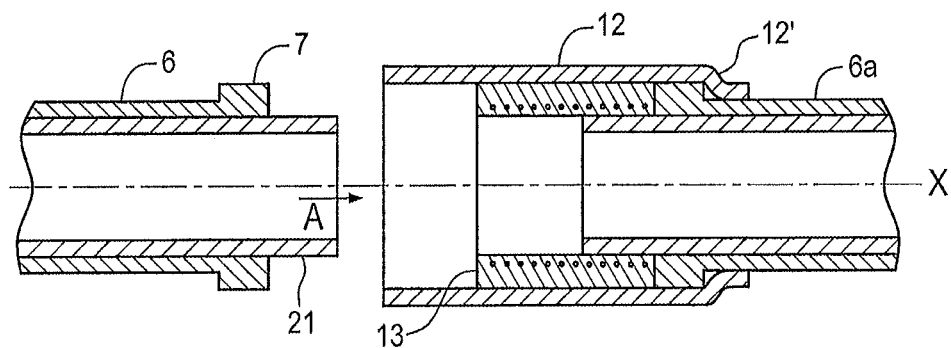
FIGS. 1C, 1D and 1E are sectional views showing a process to complete the pipe connection of FIG. 1B.

Referring to FIGS. 1A to 1E, when pipe 6 is inserted into the end of pipe coupling, arrows A in FIG. 1C, the retaining flange 7 of the metal pipe is inserted inside the inner surface of the metal coupling shell 12. The plastic lined metal pipe 6 will insert axially into the pipe coupling 8 until retaining flange 7 contacts step 13 inside the coupling, which in this embodiment is the end face of plastic coupling sleeve 9. When the plastic lined metal pipe 6 is fully inserted, ends 12a of metal coupling shell 12 will overlie and possibly extend past the retaining flange 7. The long axis of pipe 6 aligns substantially with the end to end axis of coupling 8, these are shown by axis x.

When pipe 6 is inserted, extension 21 of liner 4 also is inserted into the inner diameter of sleeve 9 and extension 21 is close to, and possibly in contact with, the inner surface of the plastic coupling sleeve 9. Because the end of the pipe flange 7 is stopped against step 13 and extension 21 is sized to have an extended length selected to overlap the axial length spanned by conductor 10 relative to the end of the sleeve, which is step 13, the insertion process ensures that extension 21 overlaps conductor 10.

The extension 21 is then fused to the plastic coupling sleeve 9. The plastic materials of these parts may be fused together by connecting an electrical power source to the exposed contacts 11 and running a current through the electrical conductor 10. The electric current generates heat and raises the temperature of the plastic materials allowing them to melt and fuse together. A sealed plastic connection is thus formed between sleeve 9 and liner 4.

Figure 1D:
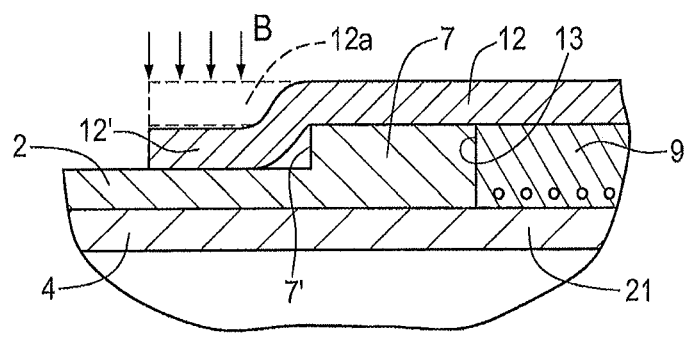

As shown in FIG. 1D, the metal coupling shell 12 is then secured to the lined pipe 6 by enveloping the retaining flange with shell 12. In particular, in this embodiment, shell end 12a is plastically deformed radially inward around the circumference forming a return 12' behind shoulder 7' of the retaining flange 7. Return 12' can be formed by applying a force, arrows B, to plastically deform the metal coupling shell end. In operation, return 12' catches against shoulder 7' and holds the pipe from being pulled out of coupling 8. Return 12' narrows the opening out of the end of the coupling and flange 7 cannot pass through. A metal-to-metal mechanical engagement is thus formed. A portable crimping machine may be used to plastically deform the metal coupling shell 12. Alternately, other means may be employed to plastically deform the coupling shell such as a press ring (for example, item 442, in FIG. 6), described herein after.

Other embodiments of a coupling may be employed to achieve the metal-to-metal and liner-to-liner connections. For example, with reference to FIG. 5, a coupling 208 is shown having a split metal shell, here formed of two half shells 212a, 212b. The half shells allow the shell to be placed to encircle and envelope flanged ends of two pipes, such as any of those described above. Then half shells 212a, 212b can be secured in place by fasteners secured through apertures 218. Half shells 212a, 212b can be pre-formed with returns 212' to fit behind the shoulders on the pipe flanges.

While half shells are shown, other configurations are possible such as split metal shell with more than two parts or a split metal shell with only one slit, forming a C-shaped shell member capable of being opened up to encircle the pipe ends.

Coupling 208 includes a plastic sleeve 209 for completing the plastic to plastic seal within the pipe connection. Sleeve 209 is a circumferentially continuous tube and is fit over the ends of the pipes to be connected and electro-fused in place prior to installation of the shell. In such an embodiment, contacts 211 are exposed on the outer surface of shell 209. While shell 209 may be entirely formed of plastic with conductors 210 carried thereon, if desired, for greater durability and strength, sleeve 209 could include a metal reinforcement such as a metal tube 215 incorporated in, or encircling, a plastic portion 216 in which the conductors 210 are embedded. The metal reinforcement and the plastic portion of sleeve 209 may be the same axial length and may form a flush circumferential face 213 at both ends to facilitate butting of the pipe flanges thereagainst to prevent crushing of the connection and to ensure proper placement of the pipes relative to sleeve 209, and thereby to conductors 210.

In another embodiment, a slip flange may be employed that allows flanges on the ends of the pipes to be bolted together while a plastic lined coupling with electro-fusion fitting is clamped between them. The bolted flanges provide a metal-to-metal connection between the pipes, while the liners can be connected through the coupling. The flanges can be retained on the pipes by forming ends by one of the various methods shown in as in FIG. 1A, 2A-2E or 3A.

Figure 1E:
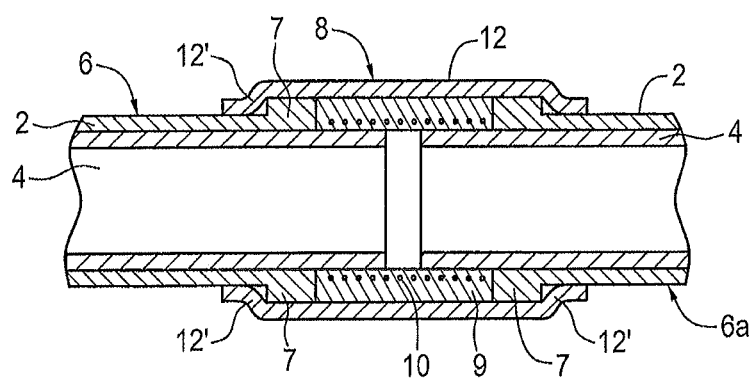
Figure 5:
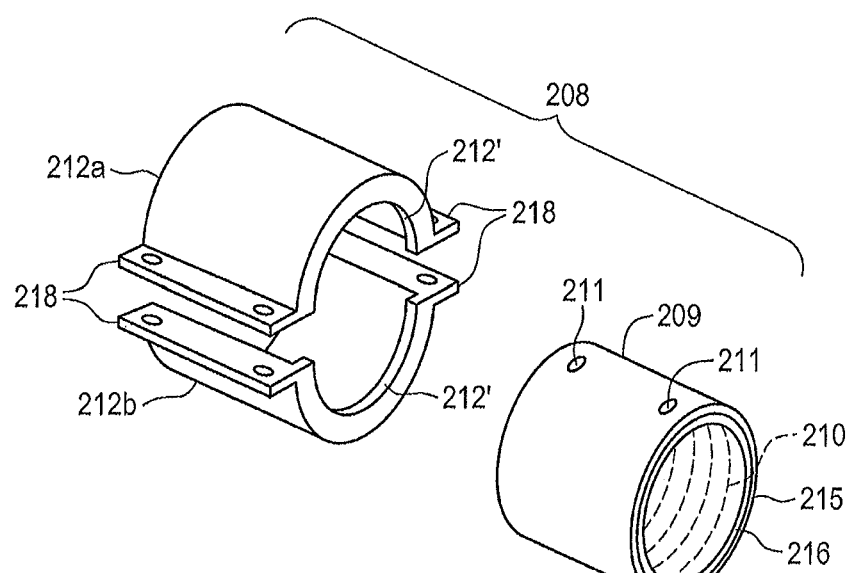
FIG. 5 is a perspective, exploded view of a split clamp coupling

The above noted discussion of FIGS. 1E and 5, focuses on a metal-to-metal mechanical connection employing a shear connection with an interlocking of preformed or on-site formed flange connections (i.e. connection of flanges on the pipes with returns on the coupling). Another metal-to-metal mechanical shear connection is described in FIG. 6 which employs a coupling 408 that is plastically deformed into engagement with one or more pipes 406 that the coupling is to connect. Like threading, these metal-to-metal connections can also provide fluid tight connections, if secondary containment is of interest for fluids leaking past the liner.

In the illustrated embodiment, a pipe to be connected is treated at its end to have a plurality of teeth 441 extending radially out from the outer surface of its metal pipe 402. Outer shell 412 of the coupling is then deformed into engagement with teeth 441 to engage the teeth via a shear connection. Outer shell 412 is thus mechanically engaged to the metal pipe of pipe 406. If there is concern of spring back disengaging the shell from the teeth, a press ring 442 may be employed to overlie the plastically deformed area of shell. In fact, press ring 442 may be employed to cause the deformation of pipe 402 into engagement with teeth 441. Ring 442 acts in a manner similar to insert 340 of FIG. 3A.

Teeth 441 may be installed on metal pipe 402 in various ways. If metal pipe 402 has a thin wall thickness, it may be difficult to install the teeth thereon and/or it may be difficult for the metal pipe to withstand the compressive force of shell 412 being pressed into engagement with the teeth. Thus, in one embodiment pipe 406 is prepared by installation of a ring 403 on the end of metal pipe 402. Ring 403 may be similar to the rings 203, 303 described above in FIGS. 2 and 3A, but ring 403 has a plurality of circumferential protrusions, herein called teeth 441, extending out from the external, exposed surface of the metal ring. The teeth may be similar to those described above in relation to FIG. 3.

To form a pipe connection with coupling 408 and pipe 406, metal pipe ends are prepared with a ring 403, for example, as per one of the systems described for FIG. 2 or 3. Metal coupling 408 is used to join two sections of pipe 406, 406a. Coupling 408 includes metal sleeve 412 and a plastic sleeve 409 within sleeve 412. An extension 412a of sleeve 412 extends beyond plastic sleeve 409 on each end of the coupling. The inside diameter of the metal coupling sleeve at extension 412a is larger than the major diameter of teeth 441 on the external surface of the pipe.

Pipe 406 can be connected to coupling 408 with a metal-to-metal engagement by inserting the pipe into sleeve 412. Prior to inserting the pipe end into the metal coupling sleeve 412, a press ring 442 is positioned over the end of the pipe and past the teeth. Pipe 406 is then inserted into the coupling, arrows C. This places extension 421 of the pipe's liner 404 into the inner diameter of plastic sleeve 409. The conductor 410 in sleeve 409 can be energized to melt and fuse the plastic of the extension and sleeve 409. This creates a continuous pressure tight bladder across the connection.

When installing pipe 406, it can be inserted into coupling until ring 403 is stopped against the shoulder formed by the end face of sleeve 409. This ensures that extension properly overlaps the area spanned by conductor 410, where electro-fusion occurs.

The press ring is used to "energize" the attachment between the metal coupling sleeve and the teeth. The press ring 442 acts as an external swage to drive the deformation of the shell into engagement with teeth 441, and can remain in place on the connection to prevent spring back and hold engagement under operational load, as noted above with respect to insert 340 in FIG. 3. The inside diameter of the press ring 442 is smaller than the outside diameter of the metal coupling sleeve. The interference between these diameters corresponds to, is substantially equal to, the amount of deformation that pipe needs to undergo to close any clearance between teeth 441 and shell 412 and to force shell 412 into embedment with the teeth. The leading edge of the inside surface of the press ring 442 has a bevel with an angle selected to compress the metal coupling sleeve without axially buckling it.

Pipe 406a is shown with its joint to coupling 408 already assembled and energized. The press ring 442a for that pipe has been axially pressed over the metal coupling sleeve 412 and into engagement with teeth 441a on that pipe.

The wall thickness and material properties of the press ring are selected to be sufficiently stiff and strong to deform the metal coupling sleeve 412 radially inward. The inside surface of the metal coupling sleeve will compress radially into contact with the teeth on the outside diameter of ring 403. The area of the teeth that first comes into contact with the inside diameter of the metal coupling sleeve will create a localized high contact pressure and will penetrate and embed into the inner surface of the metal coupling sleeve. The profile of the teeth, wall thickness of press ring 442 and the material strength of the press ring are selected to optimize this embedment for maximum shear strength of the attachment. The portions of the shell not in contact with the teeth will deform and flow into the spaces between the teeth.

The press ring 442 is only required to provide hoop stiffness and strength to the assembled joint, therefore during installation of the press ring 442, the interface between the inner surface of the press ring 442 and the outer surface of the metal coupling sleeve 412 can be lubricated. This lubrication can significantly decrease the forces required to install (i.e. press) the press ring over the metal coupling sleeve.

Embedment of the teeth of the retaining flange into the metal coupling sleeve creates a shear interface that transfers the axial forces, created by the internal pressure of the fluids being transported by the pipeline, from the pipe to the coupling sleeve. The force is transferred by the shear strength of the materials. The metal-to-metal interface of the teeth and the metal coupling sleeve is under significant contact pressure and thus forms a good seal for containing the fluids transported by the pipeline. While this may be more important for later embodiments, such as of FIGS. 7 and 10, any rough, uneven or out-of-round characteristics of the inner surface of the metal coupling sleeve will not decrease the effectiveness of the metal-to-metal seal because of the manner in which the teeth penetrate and embed into the inner surface of the metal coupling sleeve. It may be useful to employ asymmetrical teeth where the steeper flanks of the teeth face toward the direction from which the press ring 442 is applied over metal shell 412a and teeth 441. If a pressure tight connection is of interest, teeth 441 may be formed in a continuous, annular manner. Also, if a pressure tight connection is of interest, it may be desirable to provide a fluid tight seal between each contact and shell 412 to provide secondary containment against release of leaked fluids.

Figure 6:
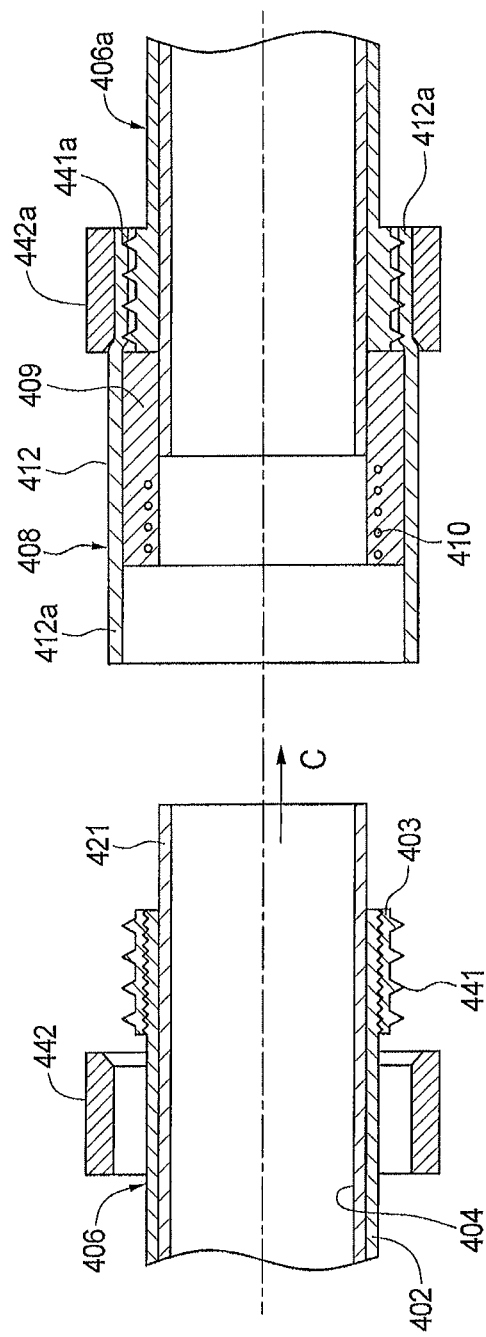
FIG. 6 is a sectional, exploded view of a pipe connection in the process of being made up.
Figure 7A:
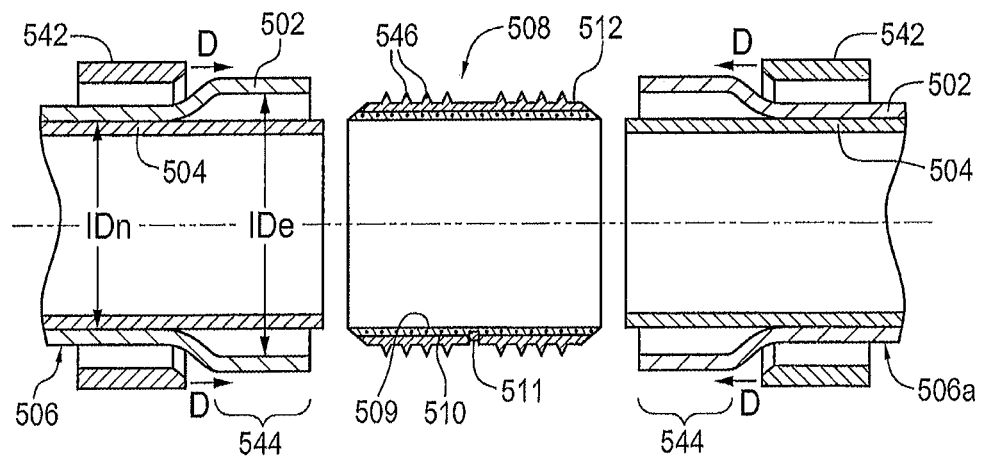
FIGS. 7A and 7B are exploded and made-up sectional views, respectively, of a pipe connection. These figures are sometimes referred to herein collectively as FIG. 7.
Figure 7B:
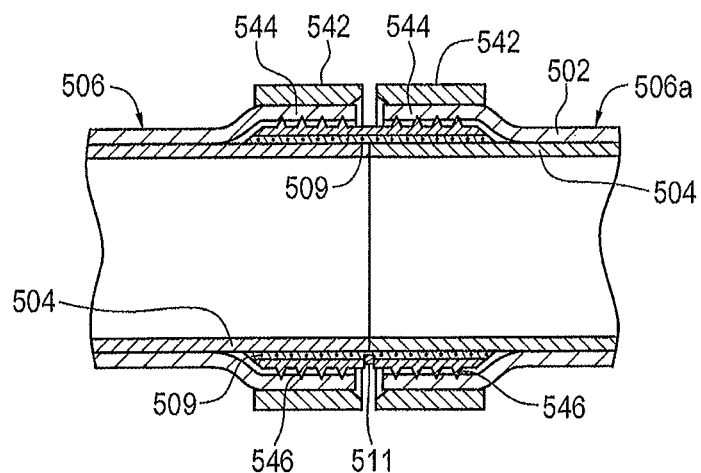

FIGS. 7A and 7B show an alternative for a pipe connection based on that described in FIG. 6. The illustrated pipe connection includes a coupling 508 for forming a metal-to-metal joint between two sections of pipe 506, 506*a* to form a pipeline. Pipes 506, 506*a* are each plastic lined, each including an outer metal pipe 502 and an inner plastic liner 504. Coupling 508 takes the form of an internally positioned mandrel and includes teeth 546 extending radially outwardly from sleeve 512 and into engagement with which pipe 502 can be driven. Coupling has a length to span between the ends of the pipe and fits within the pipe ends. Thus, the ends of the pipes are each sized to accommodate coupling 508, the inner diameter of the ends being slightly larger than the major outer diameter across coupling 508 at its teeth. To avoid a constriction in the inner diameter of the pipe, the metal pipes may be expanded at their ends to accommodate the coupling. For example, as shown, each metal pipe 502 has an upset, bell end 544 where the inner diameter IDe of the pipe is enlarged over the normal inner diameter IDn. Bell end 544 can be formed by plastic deformation or otherwise expanding the pipe at its end. For example, metal pipe 502 could be expanded at the factory using a hot or cold deformation process with a swage similar to that shown above. The pipe may subsequently be heat treated to stress relieve the metal. Of course, if heat is used to deform or heat treat the pipe, this should be done prior to installation of the liner.

Liner 504 extends within pipe 502 and is positioned for electro-fusion directly or indirectly to the liner of the other pipe such that a continuous bladder can be formed across the pipe connection. In this embodiment, liner 504 includes an extension into bell end 544 such that it can be positioned for electro-fusion to an electro-fusion assembly in coupling 508.

Coupling 508 includes a metal outer sleeve 512 and an electro-fusion assembly including an inner plastic sleeve 509 and a conductor 510. Contacts 511 extend through sleeve 512 and are in electrical contact with conductor 510.

A press ring 542 is positioned over the end of the pipe prior to expansion and forming of the bell ends 544. The press rings 542 remain loose on the pipe until the metal pipe section is joined with another section of metal pipe to form a plastic lined metal pipeline.

FIG. 7B shows the pipe connection after the joint has been assembled and energized. The coupling is inserted into the bell ends of the metal pipe and resides in the open annular area on each pipe between liner 504 and pipe 502. The outer diameter of the coupling at teeth 546 may be slightly less than the inner diameter of the belled end so that the coupling can be inserted without much force, for example by hand. Insertion of coupling 508 into belled ends 544 places liners 504 within the inner diameter of plastic sleeve 509 and into a position underlapping an area spanned by a conductor. As each pipe 506, 506*a* is pushed over the coupling, abutment the constricted bases of bell ends 544 against the end faces of coupling ensures that the ends of liners 504 are properly centered in coupling and reduces the risk of compression at the connection.

The inside diameter of the coupling, which in this embodiment is the inside diameter of sleeve 509, is selected to accommodate liners without a significant gap between the plastic surfaces and substantially without constricting the inner diameter of the liners. Thus, the outer diameter of the liners and the inner diameter of sleeve 509 may be about the same.

The loose press rings 542 are urged, arrows D, toward the bell ends 544 and pressed over the bell ends of the metal pipes. This attaches each of the metal pipes to the outer metal shell of the coupling 508.

The inside diameter of each press ring is smaller than the outside diameter of the bell section of the metal pipe over which it is to act. A taper on the inside leading edge of the press ring compresses the metal pipe radially inward.

Teeth 546 on the outer surface of shell 512, penetrate and embed into the inner surface of the metal pipe. As noted above, the press ring can remain in place on the assembly to stiffen and strengthen the attachment by retaining the contact pressure between the metal pipe and the coupling. The coupling teeth profile, pitch, body wall thickness and material properties may be selected to ensure that the coupling has sufficient strength to transfer the axial forces and contain the hoop forces. The coupling is also selected with sufficient hoop stiffness and strength to allow the teeth to penetrate and embed into the inner surface of the metal pipe. Teeth 546 are selected with considerations similar to that disclosed above in FIG. 3.

If teeth 546 are continuous in a circumferential direction around the coupling, their embedment in pipe wall 502 can provide a pressure-tight seal. In such an embodiment, it may be useful to provide a seal between any electro-fusion contact and any port in the metal shell through which the contact is exposed or mounted such that a fluid tight seal can be provided at that point as well.

The above noted discussions focus on a metal-to-metal connection employing interlocking mechanical connections based on a shear connection. Another shear-type, metal-to-metal connection between the pipes and the coupling could alternately be provided by direct threaded coupling, wherein the pipe ends and the ends of the coupling are threaded. This is useful where the pipe and coupling metal wall thickness is sufficient to accommodate a thread.

Figure 8A:
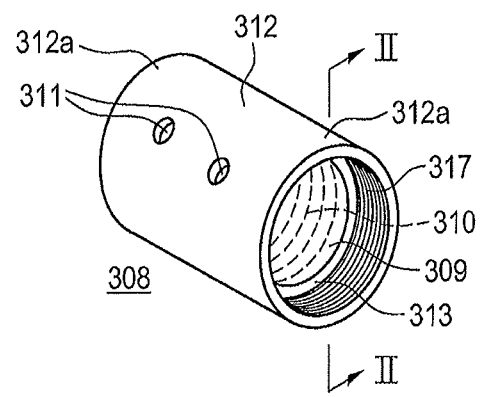
FIG. 8A is a perspective view is a perspective view of a threaded coupling and FIG. 8B is a sectional view along line II-II of FIG. 8A. These figures are sometimes referred to herein collectively as FIG. 8.
Figure 8B:
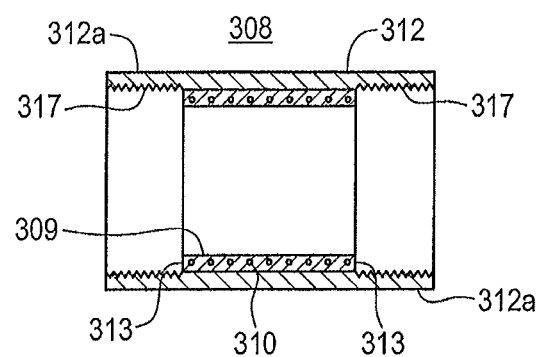

With reference to FIGS. 8A and 8B, a pipe coupling 308 is shown including an inner plastic coupling sleeve 309 formed as a tube and including an inner surface defining an inner diameter, an outer surface and a wall thickness between the inner surface and the outer surface. An electrical conductor is supported by sleeve 309 and extends about a circumference of the sleeve in a helical pattern. An outer metal coupling shell 312 formed as a tube and having an inner surface in contact with the outer surface of the plastic coupling sleeve and an outer surface defining an outer diameter and the outer surface of the coupling 308. Contacts 311 are exposed on the outer surface and are electrically in contact with the electrical conductor for connecting an electrical power source to the electrical conductor for electro-fusion.

At both ends of the pipe coupling, the metal coupling shell includes extensions 312*a* extending along its axis a specific length past the end of the plastic coupling sleeve, which may be symmetrical at both ends. In this illustrated embodiment, both extensions 312*a* are formed as internally threaded boxes with an internal thread 317 formed on the inner surface. The diameter and form of the thread 317 is compatible with an external thread machined into the outer surface of the metal pipe of the plastic lined metal pipe to be installed therein.

In one embodiment, a step 313 is formed at the end of plastic sleeve 309. Step 313 may be employed to reliably stop advancement of the pipe along thread 317 and thereby properly position the pipe's liner extension in the region of sleeve 309 where electro-fusion is conducted. However, the step 313 is not needed to resist axial crushing in the same way as some connections, since threads operate biaxially to hold the parts together. Thus, in another embodiment, there is no step 313 or the inside diameter of extension 312*a* may be smaller than the inside diameter of the portion of the metal coupling shell 312 at the plastic coupling sleeve 309. The transition of the inside diameter of the metal coupling shell 28 may facilitate compatibility of the internal thread with an external thread machined into the outer surface of the plastic lined metal pipe.

In another embodiment, a coupling may be employed with one threaded end and one end to be connected to a pipe in another way, as by crimping for example.

Figure 9A:
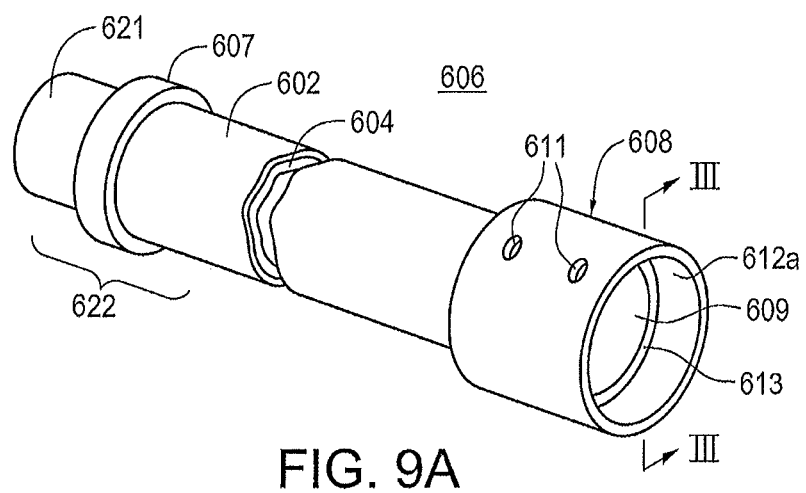
FIG. 9A is a perspective view of a plastic lined metal pipe and FIG. 9B is a cross section taken along line III-III of FIG. 9A. These figures are sometimes referred to herein collectively as FIG. 9.
Figure 9B:
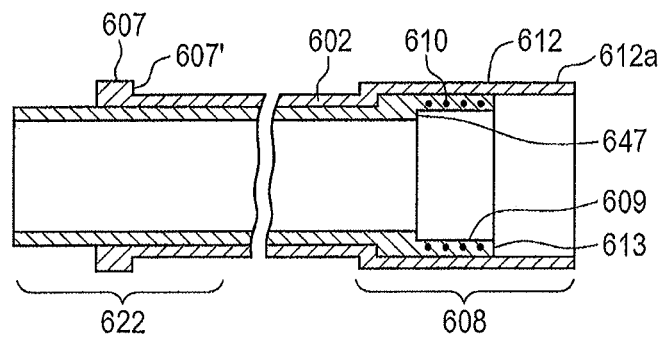

While the foregoing description has focused on couplings that are separate from the pipes to be joined, it is to be understood that the coupling can be integrated with one of the pipes. For example, referring to FIGS. 9A and 9B, there is shown a plastic lined metal pipe 606 with a coupling end 608 having an integrated coupling, the pipe includes: a metal pipe 602 formed as a tube and having an inner diameter and an outer surface defining an outer pipe diameter. The metal pipe forms the outer wall of pipe 606. An inner plastic liner 604, formed as a tube, lines the metal pipe. The inner surface of the liner defines an inner pipe diameter and is the space through which fluids conveyed by the pipe are passed. A coating may be bonded to the outer surface of the metal pipe including over the coupling 608.

Each pipe has a discrete length defined by its ends. One end is a pin end 622 and a coupling end 608. The ends 622 and 608 are formed to cooperate to permit connection of the pin end of one pipe into the coupling end of a next pipe to form a pipeline. In this illustrated embodiment, the pipes are intended to be connected by plastic deformation and shear engagement of the coupling end of one pipe over the pin end of a next pipe.

Thus, in this embodiment, the pin end 622 of the plastic lined metal pipe has the plastic liner extending along its axis past the end of the metal pipe, forming an extension 621. Pin end 622 also includes a means for permitting a metal-to-metal mechanical engagement with an adjacent pipe. In this embodiment, a retaining flange 607 is formed as an axis symmetrical protrusion extending radially outward from the outer surface. The retaining flange 607 may be formed in various ways, as described above, for example through plastic deformation of the metal pipe, connection of a ring, threading, etc.

Coupling end 608 of the plastic lined metal pipe is to operate in a fashion similar to the individual couplings 8, 308, etc. noted above to engage with another pipe both through a metal-to-metal connection and a plastic to plastic fluid tight connection. Coupling end 608 includes an outer metal coupling shell 612 formed from or connected to metal pipe 602. Coupling shell 612 is formed as a tube and has an inner surface and an outer surface defining an outer diameter. At its outboard end, shell 612 is open and has an inner diameter capable of fitting over flange 607.

Coupling end 608 also includes an electro-fusion assembly including an inner plastic coupling sleeve 609 formed as a tube and including an inner surface defining an inner diameter, an outer surface and a wall thickness between the inner surface and the outer surface, an electrical conductor 610 embedded in the wall thickness and extending about a circumference of the sleeve in a helical pattern and a pair of contacts 611 exposed on the outer surface of shell 612 and electrically in contact with the electrical conductor 610 for connecting an electrical power source to the electrical conductor 610.

One end of the plastic coupling sleeve 609 is joined to the plastic liner 604 and the other end of the plastic coupling sleeve 609 is open. Liner 604 and sleeve 609 may be formed integral. In another embodiment of the invention, the plastic pipe sleeve 609 is fastened to the plastic liner 604 by fusion such as by electro-fusion, socket or butt fusion performed at the factory. Because the extension 621 of the pin end is intended to fit into the sleeve of the coupling end, the inner diameter across sleeve 609 may be greater than the outer diameter across liner extension 621. Thus, a diameter transition 647 such as a step may be present between liner 604 and sleeve 609.

If electro-fusion is employed to connect sleeve 609 to liner 604, a dual zone conductor may be required. For example, one conductor with contacts is required for the electro-fusion to connect sleeve 609 to liner 604 and another assembly of conductor and contacts is required to connect the field inserted liner to the sleeve.

One end of the metal coupling shell 612 is connected to (i.e. secured to or formed integral with) the metal pipe, the other end of the metal coupling shell forms an extension 612*a* extending along its axis a length past the open end of the plastic coupling sleeve 609.

There is a diameter change between inner surface of extension 612*a* and inner diameter of sleeve 609 that creates a step 613. In this embodiment, the wall thickness of sleeve 609 creates the step. Other embodiments are possible, for example, where the step is formed in part of material in addition to plastic sleeve 609. For example, the step can be formed in whole or in part from the shell 612 or via an insert between shell 612 and sleeve 609.

The plastic lined metal pipe with integrated coupling may be assembled at the factory in discrete lengths appropriate for handling and transportation. In fact, it will be appreciated that the illustrated pipe is similar in form to the connected pipe 6*a* and coupling 8 of FIG. 1C.

The process to form a pipe connection may be similar to one of the processes described herein with respect to FIG. 1, 6 or 8. In particular, using two pipes similar to pipe 606, the pin end 622 of one plastic lined metal pipe is inserted axially into the integrated coupling end 608 of another pipe. In so doing, retaining flange 607 of the metal pipe is inserted inside the extension 612*a* of metal coupling shell 612 and extension 621 is inserted into sleeve 609. Because of abutment of flange 607 against step 613, extension 621 is properly placed overlapping an area spanned by conductor 610. At the same time, the metal coupling shell extension 612*a* extends past the rear shoulder 607' of the retaining flange.

The extension 621 is then fused to the plastic coupling sleeve 609. The plastic materials are fused together by connecting an electrical power source to the exposed contacts 611 and generating a current through the electrical conductor 610. The electric current generates heat and raises the temperature of the plastic materials allowing them to melt and fuse together.

The metal coupling shell 612 is then secured to the pin end of the plastic lined metal pipe 606 by plastically deforming the metal coupling shell radially inward to form a return around the rear shoulder 607' of the retaining flange.

To be clear, in other embodiments of the invention, threaded engagement may be employed between the pin end and coupling end, by forming cooperating threads on the parts. Alternately, the connection system as described in FIG. 6 may be employed. As well, the many options described above may be employed alone or in combination.

Another pipe with an integrated coupling is shown in FIGS. 10A to 10E. This pipe connection employs plastic deformation to provide engagement between the pipes and the coupling. As will be appreciated, it is based on the technology disclosed above with respect to FIGS. 7A and 7B and can employ the many options described.

In this embodiment, the pipe connection connects two similar pipes 706, 706*a*. These pipes are plastic lined metal pipes, each with a first coupling-receiving end 723*a* and a second coupling-receiving end 723*b*. When connecting the pipes to form a pipe connection, first coupling-receiving end 723*a* of a first pipe is connected to second coupling-receiving end 723*b* of a second pipe via a coupling 708 and press rings 742*a*, 742*b*.

The pipes each include a metal pipe 702 that forms the outer surface of the pipe and an inner plastic liner 704. A coating may be bonded to the outer surface of the metal pipe including over the ends 723*a*, 723*b*. Each pipe has a discrete length defined by the ends.

Coupling 708 is a metal sleeve with a continuous cylindrical wall. As in FIGS. 7A, 7B, coupling 708 takes the form of an internally positioned mandrel and has a length to span between ends 723*a*, 723*b*. Coupling 708 has outwardly facing teeth 746 and fits within pipe ends 723*a*, 723*b* and the metal pipes 702 are pressed into engagement with teeth 746 of the coupling to hold the connection together. Thus, ends 723*a*, 723*b* are each sized to accommodate coupling 708, the inner diameter of ends 723*a*, 723*b* being slightly larger than the major outer diameter across coupling 708 at its teeth. To avoid a constriction in the inner diameter of the pipe, metal pipe 702 may be expanded at its ends to accommodate the coupling. In this illustrated embodiment, for example, metal pipe 702 is expanded at each end to form bell ends that have an inner diameter IDe larger than the normal inner diameter of the pipe. In this embodiment, the ends do not accommodate equal lengths of the coupling and thus one bell end, the one on end 723*a* is shorter than the bell end on end 723*b*. In one embodiment, the metal pipe may be expanded at the factory, as by plastic deformation using a swage, similar to that shown in FIG. 3B. Press ring 742*a* for end 723*a* may be installed on the pipe between ends 723*a*, 723*b* before expansion thereof. Press ring 742*b* can be installed by insertion over open end of end 723*b*, and so need not be installed ahead of time on pipe 706.

Plastic liner 704 lines metal pipe 702. At end 723*a*, liner 704 extends beyond the end of pipe 702 and forms an extension 721. At the other end 723*b*, liner 704 supports an electro-fusion assembly. At this end, liner 704 defines a plastic coupling sleeve portion 709 formed as a tube and including an inner surface defining an inner diameter, an outer surface and a wall thickness between the inner surface and the outer surface, an electrical conductor 710 on the wall thickness and extending about a circumference of the sleeve and a pair of contacts exposed on the outer surface of pipe 702 and electrically in contact with the electrical conductor 710 for connecting it to an electrical power source. Holes 724 may be formed in metal pipe 702 to allow access to the contacts.

One end of the plastic coupling sleeve portion 709 is joined to the plastic liner 704 and the other end of the plastic coupling sleeve 709 is open. Liner 704 and sleeve 709 may be formed integral. In another embodiment of the invention, the plastic pipe sleeve 709 is fastened to the plastic liner 704 by fusion such as by electro-fusion, socket or butt fusion performed at the factory. If electro-fusion is employed, contacts 711 are installed or reconfigured after use to be flush with or recessed into outer surface of liner 704 so that they don't restrict the insertion of liner 704 into metal pipe 702. Also, as noted above in FIG. 9 and earlier, if electro-fusion is employed to connect sleeve 709 to liner 704, a dual zone conductor may be required. For example, one conductor with contacts is required for the electro-fusion to connect the sleeve to the liner and another assembly of conductor and contacts is required to connect the field inserted liner to the sleeve.

If initially separate, liner 704 and sleeve 709 may be connected before or after installation into metal pipe 702. In this embodiment, liner 704 and sleeve 709 are fused before insertion into pipe 702, such that by FIG. 10B, liner 704 and sleeve 709 are fused together at their interface.

Because the extension 721 at the other end of the pipe is intended to fit into the sleeve of the coupling end, the diameter across sleeve portion 709 may be not be less than the outer diameter across liner extension 721. Thus, a diameter transition 747 such as a step may be present between the normal inner diameter of liner 704 and the inner diameter of sleeve 709. In addition, sleeve portion 709 may accommodate a portion of the bell to ensure that the diameter across the sleeve is sufficient to avoid a constriction in the inner diameter through liner 704. The plastic material of liner 704 may taper at an end 709' of sleeve 709 to follow the transitional contour of the enlargement at end 723*b*. End 709' may be integral with liner 704 or the sleeve portion 709 thereof or may be a separate component. End 709' acts as a filler to support liner 704 through the transitional region and avoid ballooning into a gap when the liner is pressurized, which could cause a failure.

Sleeve 709 is recessed from the edge of end 723*b* and an extension 712 of metal pipe 702 extends beyond the sleeve. A shoulder 713 is formed at the end of sleeve 709 where the inner diameter is reduced from extension 712 to sleeve 709.

To construct a pipe with an integral connection, plastic liner 704 including sleeve 709 may be installed, arrow $I_1$ (FIG. 10A), in metal pipe 702. This may be conducted in the factory. Liner 704 may be tight in metal pipe. The contacts of the electro-fusion assembly may be aligned with the access holes 724 in the pipe. Since this embodiment may provide a fluid tight seal at the connection, it may be desirable to provide a fluid tight seal in holes 724, between each contact and the pipe 702, to provide secondary containment against release of leaked fluids, if that is of interest.

Figure 10A:
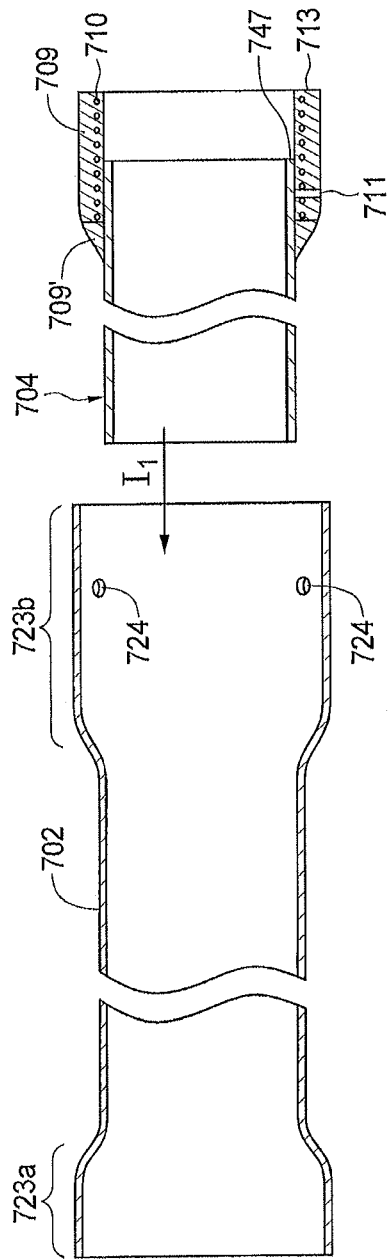
FIGS. 10A to 10E include sectional views FIGS. 10A to 10E showing a process to complete the pipe connection of FIG. 10E. These figures are sometimes referred to herein collectively as FIG. 10.
Figure 10B:
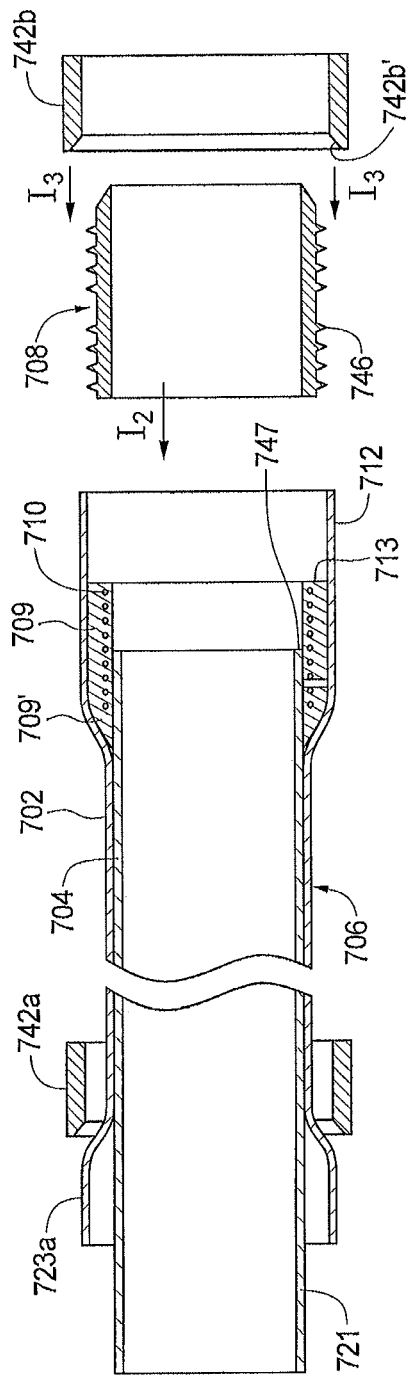

As shown in FIG. 10B, coupling 708 is inserted, arrow $I_2$, into end 723*b* until it butts against shoulder 713. Coupling 708 may be formed with a blunt (i.e. substantially non-tapered) end to facilitate butting positioning against sleeve 709 instead of riding thereover or under and to avoid the formation of gaps behind the liner which may cause liner failure when operating at pressurized conditions. When in place, the coupling is positioned in extension 712 such that end 723*b* encircles it. A portion of the coupling protrudes out of end 723*b*.

Figure 10C:
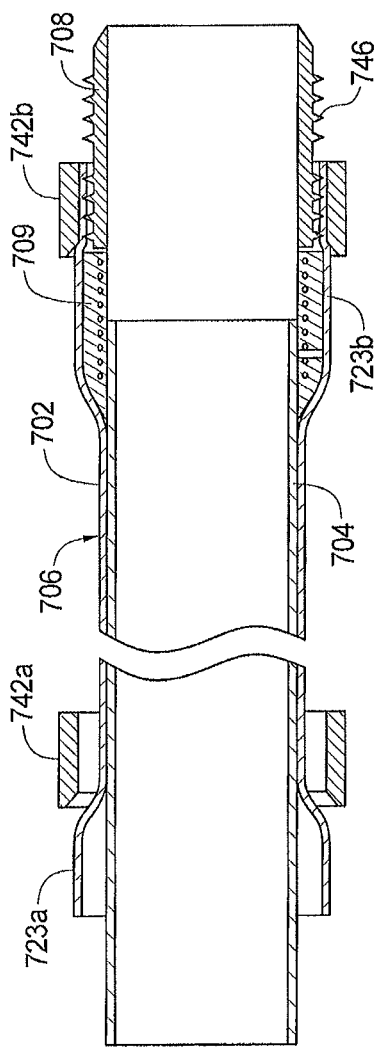

The press ring 742*b* is then pressed over end 723*b*, arrows $I_3$. The inside diameter of press ring 723*b* is smaller than the outside diameter of the expanded section of metal pipe 702 at end 723*b*. A taper 742*b'* on the inside leading edge of the press ring compresses the metal pipe radially inward as the press ring is forced axially over the metal pipe. Buckling should be avoided. Teeth 746 on the outer surface of the coupling, penetrate and embed into the inner surface of the metal pipe. As shown in FIG. 10C, press ring 742*b* will remain part of the assembly to stiffen and strengthen the attachment by retaining the contact pressure between the metal pipe and the coupling, to prevent spring back, etc., as noted hereinbefore. At this stage, however, press ring 742*a* remains loose on the pipe.

If desired, the above noted process of inserting the coupling can be carried out in the field. However, it may be useful to assemble the pipe and the coupling to this stage in the factory, as coupling 708 can retain the plastic liner including sleeve 709, within the metal pipe even during transport and handling.

To join two sections of plastic lined metal pipe 706, 706*a*, the portion of the coupling that extends from the long bell end of the pipe is inserted into the expanded metal pipe at end 723*a* of second pipe 706*a*. The coupling slides into the open annular area between metal pipe 702 and liner 704. At the same time the plastic liner extension 721 is inserted through the inner diameter of coupling 708 and into the inner diameter of sleeve 709. The relative sizing of extension 721, belled end 723*a* and the protruding length of coupling are selected such that when coupling is fully inserted into bell end 723*a*, with the end of coupling 708 butting against the constriction in metal pipe 702 and/or end of extension 721 butting against shoulder 747, extension 721 is in a position lapping inwardly of conductor 710.

Figure 10D:
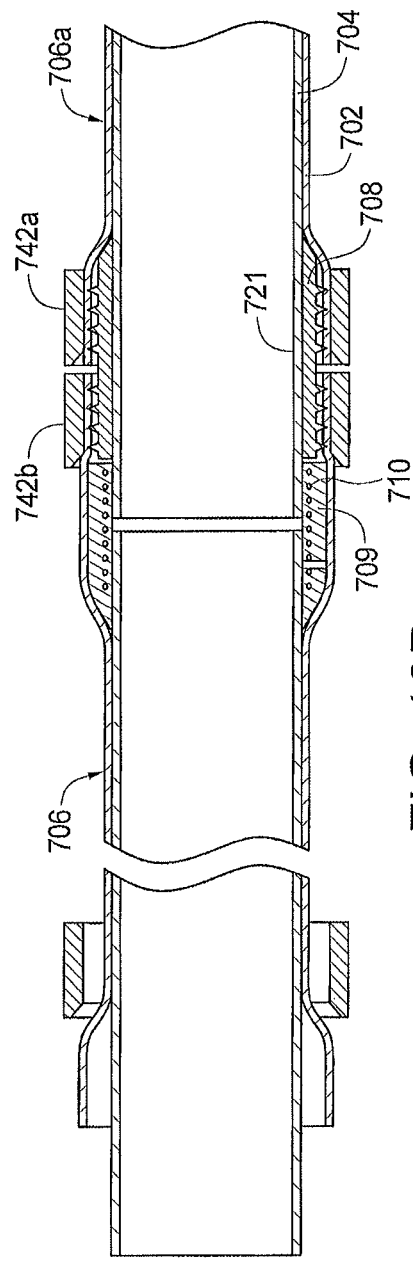
Figure 10E:
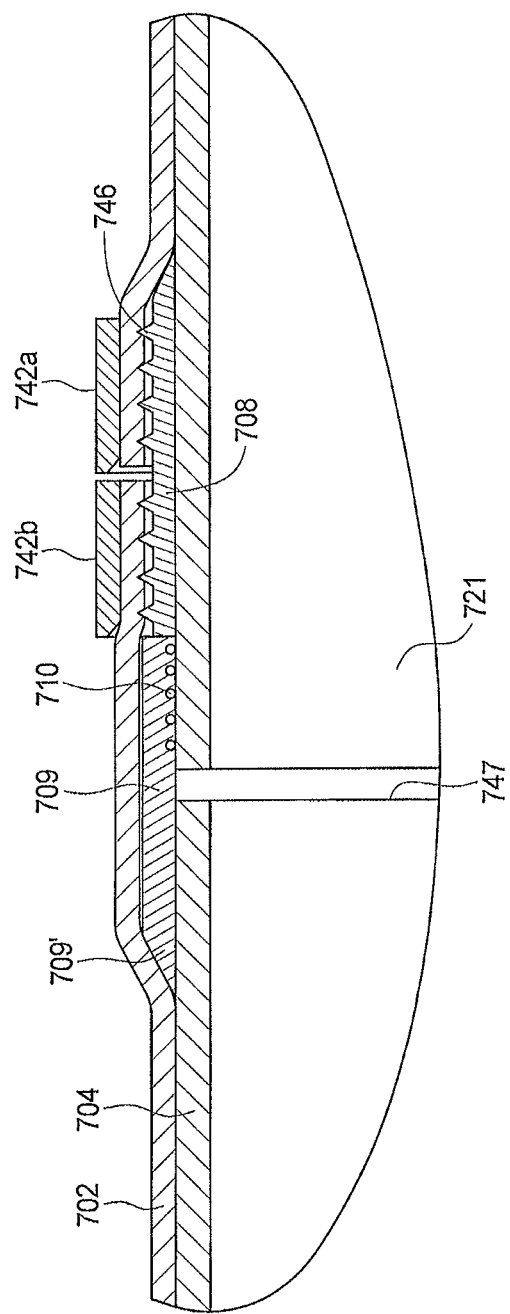

The loose press ring 742*a* of the second pipe 706*a* is pressed over metal pipe 702 at end 723*a*, which attaches coupling 708 and pipe 702. FIG. 10D shows two pipes connected together according to this method and FIG. 10E shows an enlarged view of the connected ends 723*a*, 723*b*.

The electro-fusion conductor may then be energized to join the plastic liners 704 in the two pipes to form a leak-tight bladder.

It will be appreciated that the plastic liner and the electro-fusion sleeve of the embodiment of FIG. 7A could be modified to be more similar to those described in FIGS. 10A-D, for example, with sleeve 509 moved from coupling 508 to a position connected to one liner. Alternately, the plastic liner and the electro-fusion sleeve of the embodiment of FIGS. 10A-D could be modified to be more similar to that described in FIG. 7A.

Electro-Fusion Contact

The use of a insulated, sealed electro-fusion contact has been noted above. In particular, the electro-fusion assembly includes a plurality of contacts electrically in contact with an electrical conductor in an amount of plastic to be fused for connecting an electrical power source to the electrical conductor. The contacts are exposed on the outer surface of the pipe or the coupling so that they are accessible for connection to an electrical supply. In some embodiments, this requires positioning the contacts in holes formed through the metal shell of the coupling or pipe. Thus, a hole is opened through from the interior of the coupling or pipe to the outer surface through which the contact extends or is accessed.

While the contacts are exposed on the exterior surface of the metal shell, the contacts must be electrically insulated from the metal material in order to properly conduct electricity to the conductor.

Also, since the metal shell has holes required to allow contacts to be accessed and connect with the conductor inside the metal shell, it may be desirable to provide a fluid tight seal between each contact and the shell in. A fluid tight seal between each contact and the shell may provide secondary containment against release of leaked fluids, if that is of interest.

Figure 11:
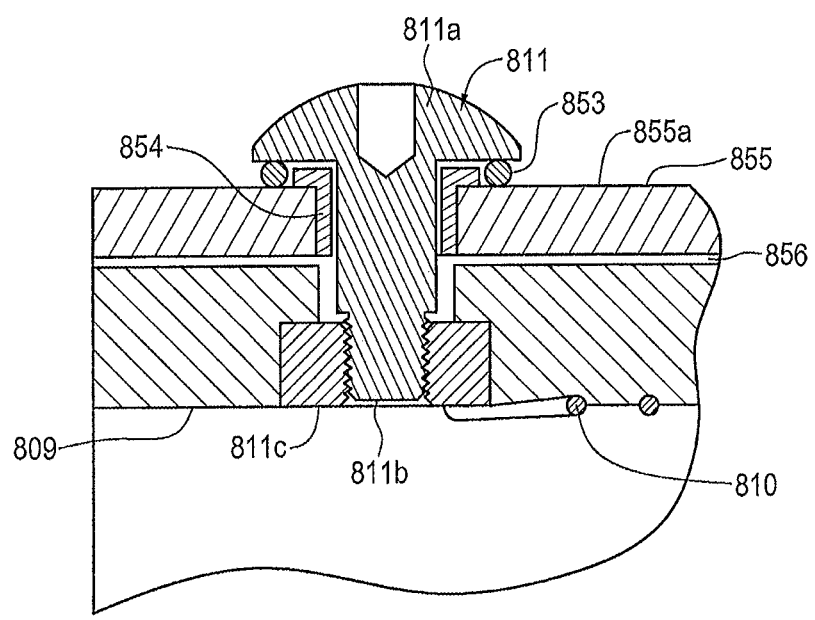
FIG. 11 is a cross section through a contact.

One embodiment of an electro-fusion contact assembly is shown in FIG. 11. The assembly includes a contact 811 providing electrical communication from an outer surface 855*a* of a metal shell 855 to an electro-fusion conductor 810 within the metal shell. Contact 811 passes through a hole 852 in metal shell 855 so that one part of the contact is exposed on the outer surface and one part is positioned inside the shell.

Metal shell 855 may be the outer metal layer of a coupling or a pipe, as will be apparent from a review of the embodiments described above.

The electro-fusion conductor is accommodated (i.e. carried on or embedded in) a plastic material sleeve 809 which will be fused to another part of formed of plastic.

The assembly shown is useful to conduct a current to the electro-fusion conductor without grounding the current to the metal sleeve and includes a seal to avoid leakage between contact 811 and sleeve 855. While other forms are possible, the illustrated contact is a bolt formed of electrically conductive material with a socket on the head end 811*a* for attachment of the power source and a threaded stem 811*b* on the opposite end which is threaded into a threaded nut 811*c*. The nut is also a conductor. The nut may be sunk or embedded into the plastic sleeve to remove it from the inner diameter and to hold the nut rotationally so it can accept threaded engagement of the stem therein without additional stabilization of the nut. Conductor 810 at one end is connected to the contact, such as to the nut or the stem or both. Connection of the conductor to the nut ensures that the connection can be made reliably before insertion of the sleeve 809 into the shell.

An insulating washer 854 electrically insulates contact 811 from shell 855 and, thereby, prevents the contact from grounding out against the metal shell. Washer 854 lines the hole through metal shell 855 and includes a cylindrical wall with bore through which stem 811*b* can pass. The cylindrical wall has a length at least substantially equal to the thickness of shell 855, such that cylindrical wall is long enough to encircle the stem as it extends past the thickness of shell 855. Washer 854 may further include an extension, such as a flange, extending out from the cylindrical wall that underlies head end 811*a* and keeps the head end insulated from outer surface 855*a* of shell 855.

Washer 854 may be selected purely for insulative purposes, or may also serve as a seal. The assembly shown also includes a separate seal between contact 811 and shell 855 that seals the hole through the metal shell allowing the metal shell to hold pressure and retain fluids that leak past sleeve 809 and accumulate in an annulus 856 between the metal sleeve and the plastic liner. A seal, herein shown as an o-ring 853, may be employed. In this embodiment, o-ring 853 is positioned encircling stem 811*b* and between head end 811*a* and outer surface 855*a*. A spot face can be machined into the outer surface of the metal pipe 855, if desired.

The nut 811*c* is larger than the hole in the metal sleeve 855 and the threaded connection between the stem and the nut can be selected to pull the head end of the contact down onto the seal. The engagement between nut 811*c* and stem 811*b* can further be selected with sufficient strength to allow the bolt to maintain the seal against o-ring 853 even when the annulus 856 is pressurized.

With the illustrated assembly, sleeve 809 with nut 811*c* in place and connected to conductor 810, can be installed in shell 855. Then washer 854 and o-ring 853 can be placed and bolt stem 811*b* can be inserted through the hole and threaded into nut 811*c*.

As an example, this contact assembly may be useful in embodiments such as FIG. 6, FIG. 7 and FIG. 10. In FIG. 10, for example, the liner may be installed in the metal pipe with nut 811*c* already installed and while installing, care may be taken to align nut 811*c* with a hole 724 such that after the liner is installed a bolt stem 811*a* can be inserted through the hole from the outside and threaded into the nut.

Embodiments Employing Unlined Metal Pipes

It has also been found that unlined metal pipes can be connected using some of the equipment and methods employed in the above-noted description. For example, a pipe connection, assembly and method as shown in FIG. 6, FIG. 7A/B or FIGS. 10A-D is useful to join metal pipes even without the plastic liner and electro-fusion assembly. In particular, the metal pipes are securely connected and, using continuous circumferential teeth 546, a fluid-tight connection may be achieved. Thus, in one embodiment, a pipe connection assembly is provided according to FIG. 6, FIG. 7A/B, FIG. 9 (as it relates to FIG. 6) or FIGS. 10A-D without a plastic liner and electro-fusion assembly.

For example, with reference to FIGS. 7A and B, the two metal pipes 502 could be employed without their plastic liners. Coupling 508 could be employed with only the metal portion 512, omitting the electro-fusion components: the plastic sleeve, the conductor and the contacts.

Figure 12:
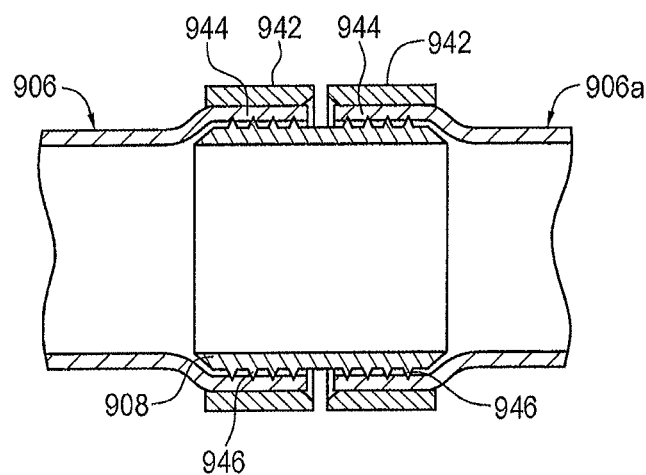
FIG. 12 is a sectional view through a made-up, unlined pipe connection.

As shown in FIG. 12, in an unlined connection, two pipes 906, 906*a* are connected by inserting a coupling 908 between the ends, deforming the pipe walls into engagement with the coupling teeth 946 and holding the pipes and coupling in engagement with press rings 942. All of the considerations noted above in reference to the pipes, coupling and press rings of FIGS. 7 and 10, apart from electro-fusion and liners, apply here. For example, the pipes can be belled 944 at their ends to accommodate the coupling within the inner diameter of the pipes. Where the metal pipes include belled ends, the inner diameter at the ends is larger than a normal inner diameter through an adjacent portion of the metal pipes. The pipe coupling, being positionable within the belled ends, may have an inside diameter substantially equal to or greater than the normal inner diameter so that a constriction is avoided in the fluid flow path through the connection.

As another example, teeth 946 may be formed annularly to ensure a fluid-tight seal at the connections between the coupling and pipes 906, 906*a*.

In this unlined embodiment, the fluid is conveyed through the connection in contact with the inner facing metal walls of pipes 906 and in contact with coupling 908, which is formed of metal. Of course, the pipes can be coated, as desired, so the exposed surfaces may not actually be a metal susceptible to be broken down in the fluid being conveyed or in the installation environment.

Methods for Forming Pipe End

With reference to FIG. 13, a method is described herein for forming a pipe end for connection to another pipe end. The method may be useful for preparing field cut pipes for accommodating tie-ins or for field-fitting a certain length of pipe.

Figure 13J:
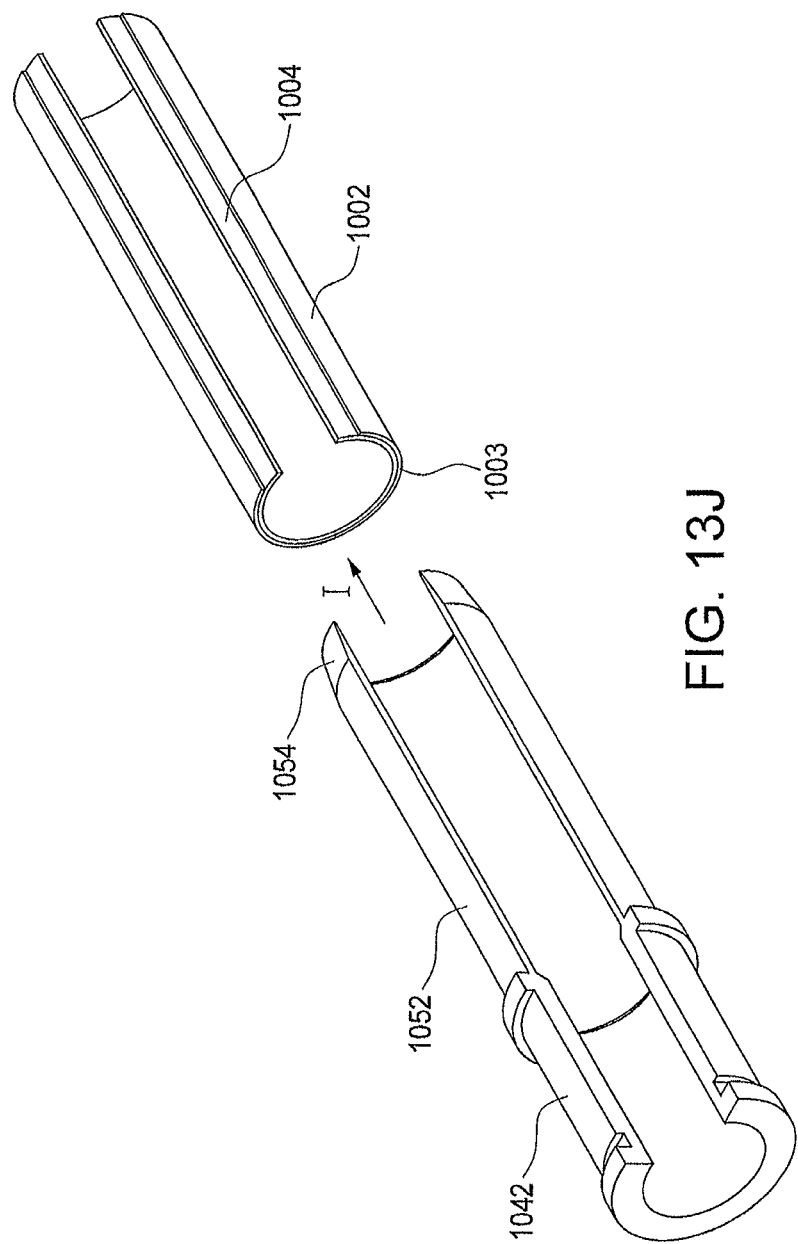

In one embodiment, with reference to FIGS. 13A, 13J, and 13G, the method for forming a pipe end for a pipe 1002 lined with a liner 1004 comprises: making a cut at an axial location of the pipe and the liner to define a first end 1003 of the pipe having an initial inner diameter, the cut being on a plane substantially perpendicular to a long central axis of the pipe; and expanding a diameter of the pipe from first end 1003 to form an upset, bell end 1044' where the inner diameter of the pipe is enlarged over the initial diameter, thereby defining an annulus between the inner surface of the pipe and the liner. The annulus is for accommodating a coupling, similar to that shown in FIGS. 7 and 10, and/or a coupling sleeve portion, similar to that shown in FIG. 10.

The pipe may be expanded at the factory and/or in the field, as by plastic deformation using a thru-bore swage 1042, similar to that shown in FIG. 3B. The swage has a tubular swage body 1052 with a tapered frustoconical end 1054. The outer diameter of the tapered end is smaller than that of the swage body. The outer diameter of the tapered end is about the same as or slightly smaller than the initial inner diameter and/or slightly larger than the outer diameter of the liner, such that when swage 1042 is inserted into the pipe from the first end 1003 in the axial direction (as indicated by arrow I), tapered end 1054 helps separate the liner from the pipe to allow swage body 1052 to expand pipe 1002 away from the liner to form the annulus, and preferably without interfering with the structural integrity of the liner. Preferably, the thickness of swage body 1052 is selected to be about the same or slightly greater than the thickness of the coupling or the coupling sleeve portion to be placed in the annulus.

Referring to FIG. 13I, the method may further comprise cutting off a portion of the bell end 1044', thereby exposing a length of the liner beyond the bell end to provide an extension 1021, similar to that shown in FIG. 10B. The extension 1021 of the liner beyond the bell end may be useful in the embodiments shown in FIGS. 7 and 10. While cutting off a portion of the bell end, the method may further comprise protecting the liner by placing a cutting shield (not shown) in the annulus.

Optionally, with reference to FIGS. 13B and 13H, the method may further comprise cutting back the liner from the first end of the pipe to expose a length of unlined inner surface of the pipe, prior to expanding a diameter of the pipe. Cutting back the liner may assist with the insertion of a swage and the separation of the liner from the pipe by a tapered end of the swage.

In another optional embodiment, and with reference to FIGS. 13C to 13F and 13H, prior to expanding a diameter of pipe to form the bell end, the method may further comprise priming the first end 1003 of the pipe for subsequently receiving thru-bore swage 1042 by increasing the inner diameter of the pipe at or near the first end to be greater than the initial inner diameter, to form an initial bell end 1044. Initial bell end 1044 may be shorter in length than bell end 1044'. Priming may be done whether or not the liner is cut back from the first end of the pipe.

In one embodiment, priming is performed by inserting a tapered frustoconical tubular body 1043 of a primer swage 1041 into the first end of the pipe in the axial direction (as indicated by arrow I). The outer diameter of tapered body 1043 gradually increases from its tip to its base. The outer diameter of the tip of the tapered body 1043 is about the same as or slightly smaller than the initial inner diameter and/or slightly larger the outer diameter of the liner, such that when primer swage 1041 is inserted into the pipe from the first end 1003, tapered body 1043 expands the inner diameter to the approximately the outer diameter of its base. If the liner is not cut back from the first end, the tapered body 1043 helps separate the liner from the pipe as the first end expands to form initial bell end 1044. It can be appreciated that the size of primer swage 1041 is selected such that tapered body 1043 can expand the first end 1003 to form an initial bell end 1044 with an inner diameter that is sufficiently large to receive the tapered end 1054 of swage 1042.

In one embodiment, the method also comprises securing the pipe with a clamp (not shown) during the expansion of the diameter of the pipe (i.e. during the insertion of the swage 1042 and/or 1041).

In one embodiment, a method for forming a pipe end for a pipe having an inner surface lined with a liner is provided herein. The method comprises: cutting the pipe at an axial location to provide a first end having an initial inner diameter defined by an inner surface of the pipe; and expanding a diameter of the pipe from first end to form an upset, bell end where an inner diameter of the upset, bell end is larger than the initial diameter, thereby defining an annulus between the inner surface of the pipe and the liner.

The step of expanding the diameter of the pipe is performed by inserting a thru-bore swage at the first end in an axial direction of the pipe.

In a further embodiment, the method further comprises cutting off a length of the upset, bell end to expose a length of the liner beyond the upset, bell end. The method may further comprise placing a cutting shield in the annulus to protect the liner while cutting off the length of the upset, bell end.

In an optional embodiment, prior to expanding the diameter of the pipe, the method further comprises cutting back the liner axially from the first end to expose a length of the inner surface of the pipe.

In a further optional embodiment, prior to expanding the diameter of the pipe, the method further comprises priming the first end by increasing the inner diameter of the pipe at or near the first end to form an initial bell end where an inner diameter of the initial bell end is larger than the initial diameter. This step of forming an initial bell end may be performed after the optional step of cutting back the liner.

In one embodiment, the step of priming the first end is performed by inserting a primer swage into the first end in the axial direction of the pipe.

In a further embodiment, the method comprises securing an outer surface of the pipe with a clamp during the expansion step and/or the priming step.

Figure 14A:
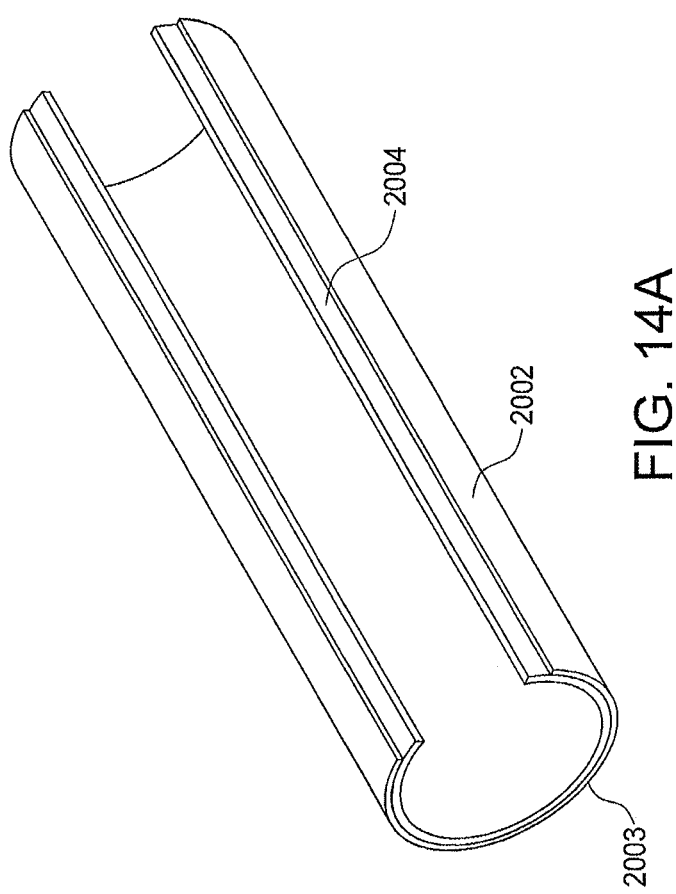
Figure 14B:
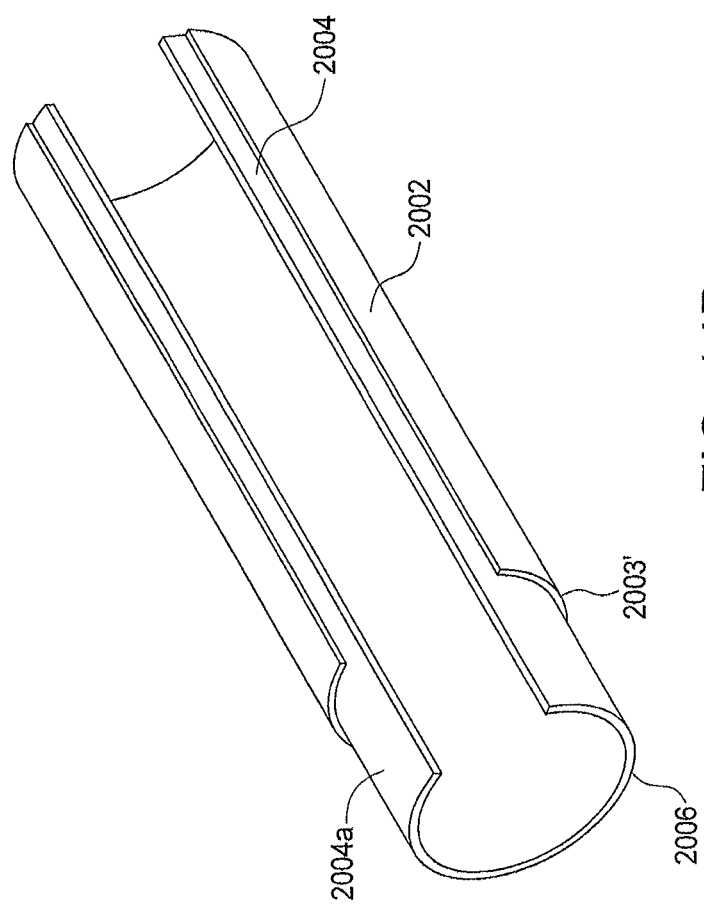

According to another embodiment and with reference to FIG. 14, a method is described for forming a pipe end for connection to another pipe end. The method may be useful for preparing field cut pipes for accommodating tie-ins or for field-fitting a certain length of pipe.

With reference to FIG. 14, the method for forming a pipe end for a pipe 2002 lined with a liner 2004 comprises: making a cut at an axial location of the pipe and the liner to define a first end 2003 of the pipe having an initial inner diameter, the cut being on a plane substantially perpendicular to a long central axis of the pipe; and expanding a diameter of the pipe from first end 2003 to form an upset, bell end 2044' where the inner diameter of the pipe is enlarged over the initial diameter, thereby defining an annulus between the inner surface of the pipe and the liner. The annulus is for accommodating a coupling, similar to that shown in FIGS. 7 and 10, and/or a coupling sleeve portion, similar to that shown in FIG. 10.

The pipe may be expanded at the factory and/or in the field, as by plastic deformation using a thru-bore swage 1042, similar to that shown in FIG. 3B. The swage 1042 is as described with respect to FIG. 13.

With reference to FIGS. 14B to 14E, the method further comprises cutting back the pipe from the first end to define a receded first end 2003' and to expose a length of liner 2004a beyond the receded first end 2003', prior to expanding the length of the pipe. The method further comprises cutting a portion of the exposed liner 2004a at its free end 2006 to form a cutout 2005.

In one embodiment, the cutout may be formed, for example, by making an intersecting cut in the exposed liner 2004a from an axial location on the exposed liner's outer surface to its free end 2006 such that the plane of the cut forms an acute angle β relative to a lengthwise central axis of the pipe (see FIG. 14E). Alternatively, the cutting may be performed in the opposite direction. Cutout 2005 may be U-shaped, V-shaped, parabola-shaped, hyperbola-shaped, or other general arc-type shape.

Other methods of forming cutout 2005 are possible. For example, in another embodiment, the cutout may be formed by making one or more cuts from the exposed liner's free end to an axial point on the surface of the exposed liner. Alternatively, the cutting may be performed in the opposite direction. In this manner, cutout 2005 may be one or more substantially straight lines, curved lines, irregular lines, etc. or any combination thereof, extending from the free end to the axial point on the surface of the exposed liner.

Whatever shape the cutout is and however the cutout is formed, the cutout provides the exposed liner a modified free end 2006' with a reduced effective diameter. It is not necessary that the cutout be symmetrical or evenly shaped throughout. The cutout provides a tapering effect on the exposed liner.

With reference to FIGS. 14F and 14G, the pipe end is expanded by inserting swage 1042 into the pipe from the receded first end 2003' in the axial direction (as indicated by arrow I). The reduced diameter of the modified free end 2006' helps the liner to be inserted and received inside the bore of the swage 1042, with minimal interference with the tapered end 1054 of swage 1042, as the swage is inserted into the pipe 2002 in direction I. As the swage 1042 is inserted into the pipe 2002, the tapered end 1054 also helps separate the liner from the pipe to allow swage body 1052 to expand pipe 2002 away from the liner to form the annulus. The upset, bell end 2044' is formed by the insertion of swage 1042.

Figure 14I:
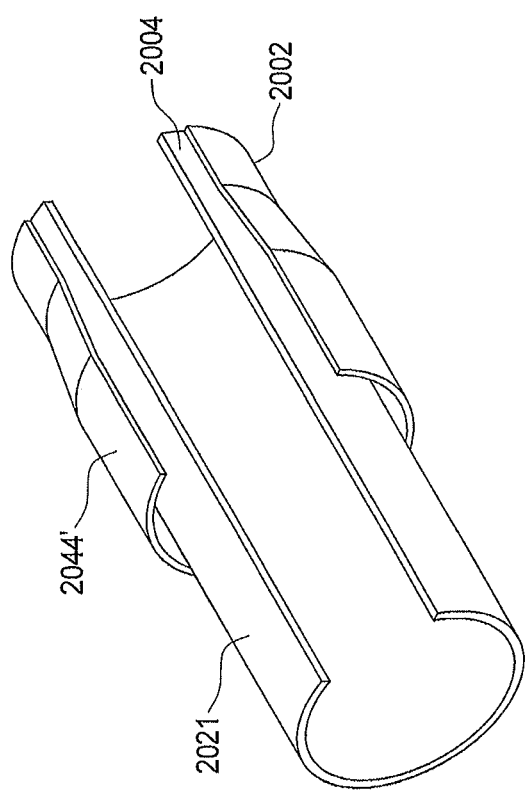
Figure 15A:
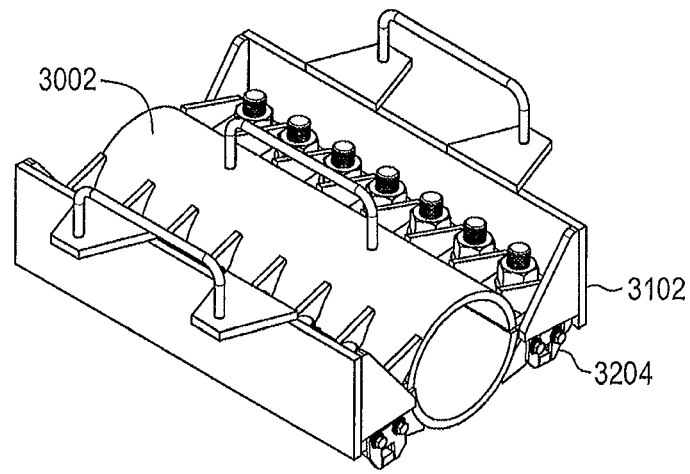
FIGS. 15A, 15B, 15C, and 15D are a perspective view, a side view, an end view, and an exploded view, respectively, of a pipe clamp according to one embodiment of the present invention. These figures are sometimes referred to herein collectively as FIG. 15.
Figure 15B:
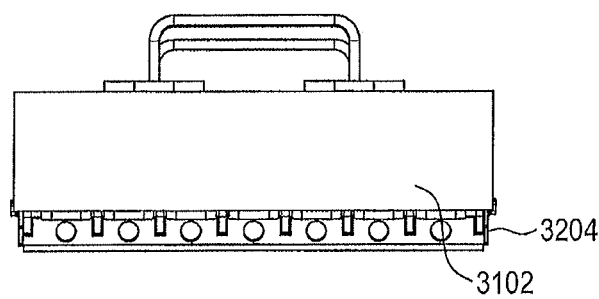
Figure 15C:
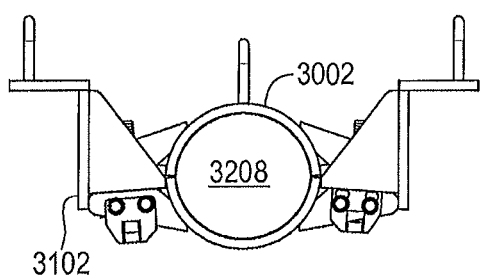
Figure 15D:
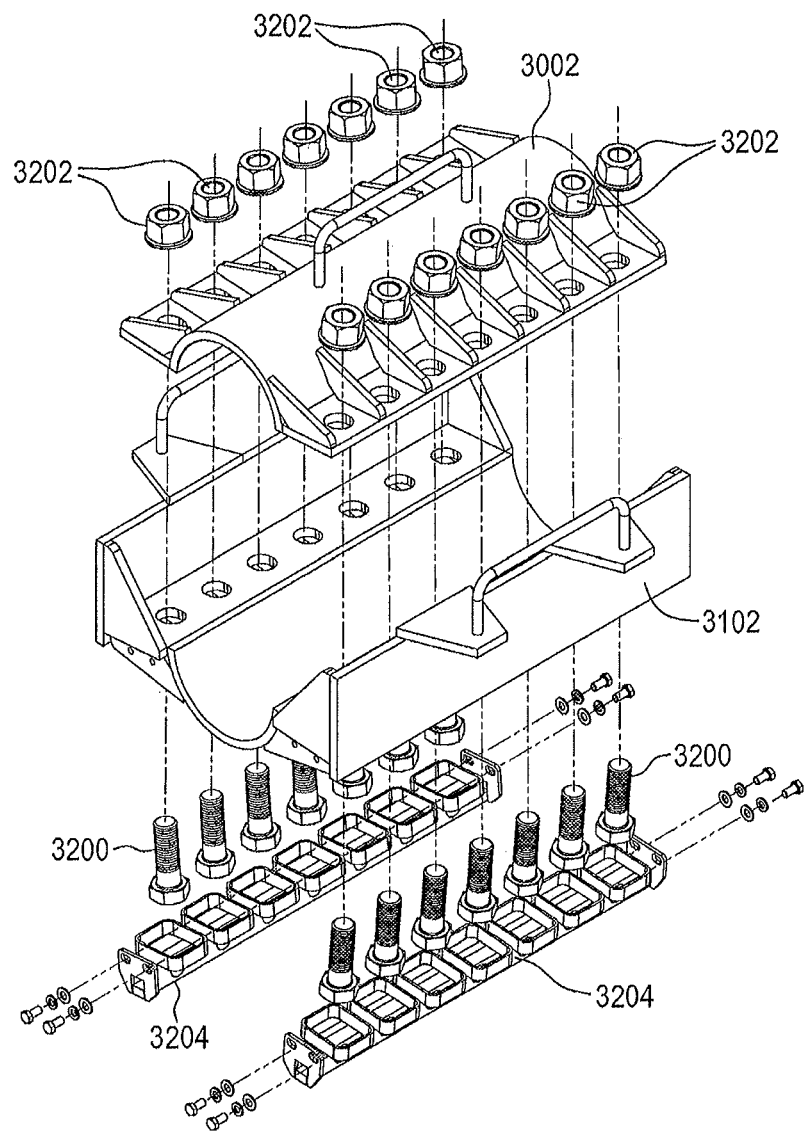
Figure 16A:
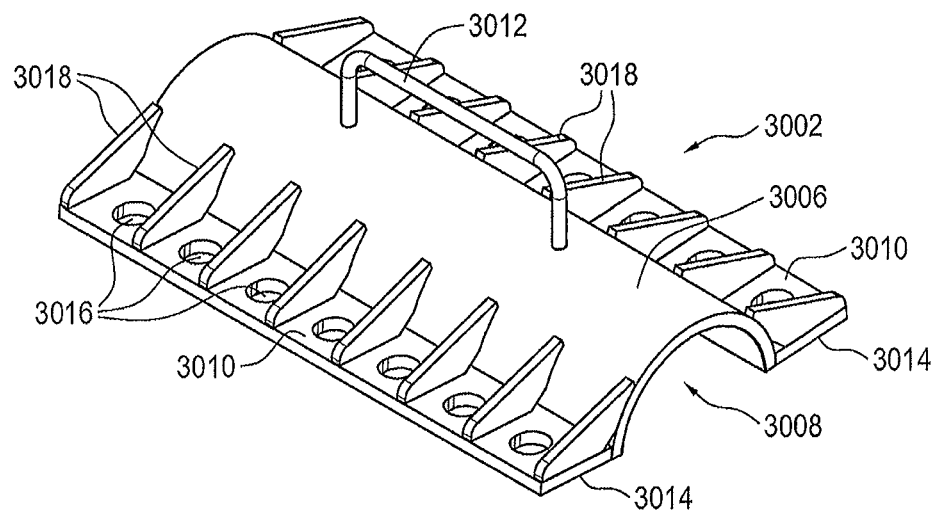
FIGS. 16A, 16B, 16C, and 16D are a perspective view, a side view, an end view, and a top elevation view of a cover of the pipe clamp shown in FIG. 15. These figures are sometimes referred to herein collectively as FIG. 16.
Figure 16B:
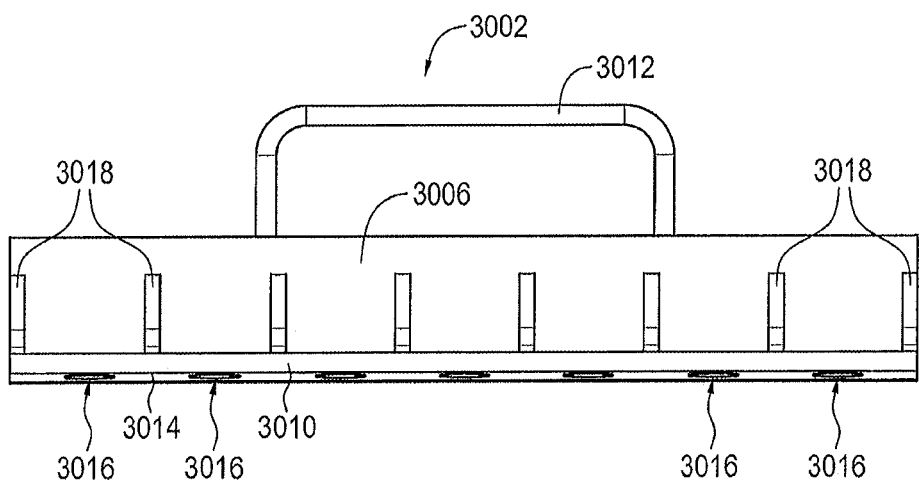
Figure 16C:
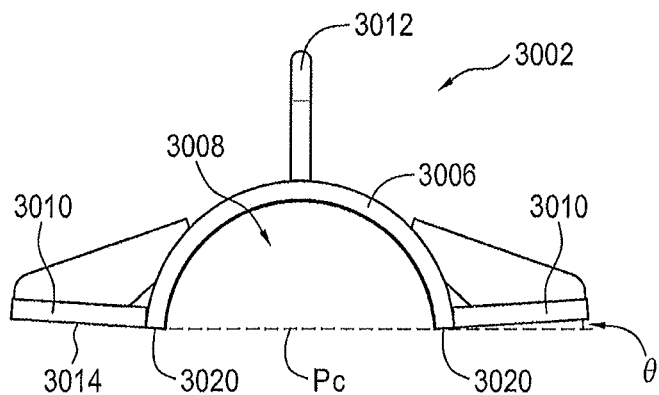
Figure 16D:
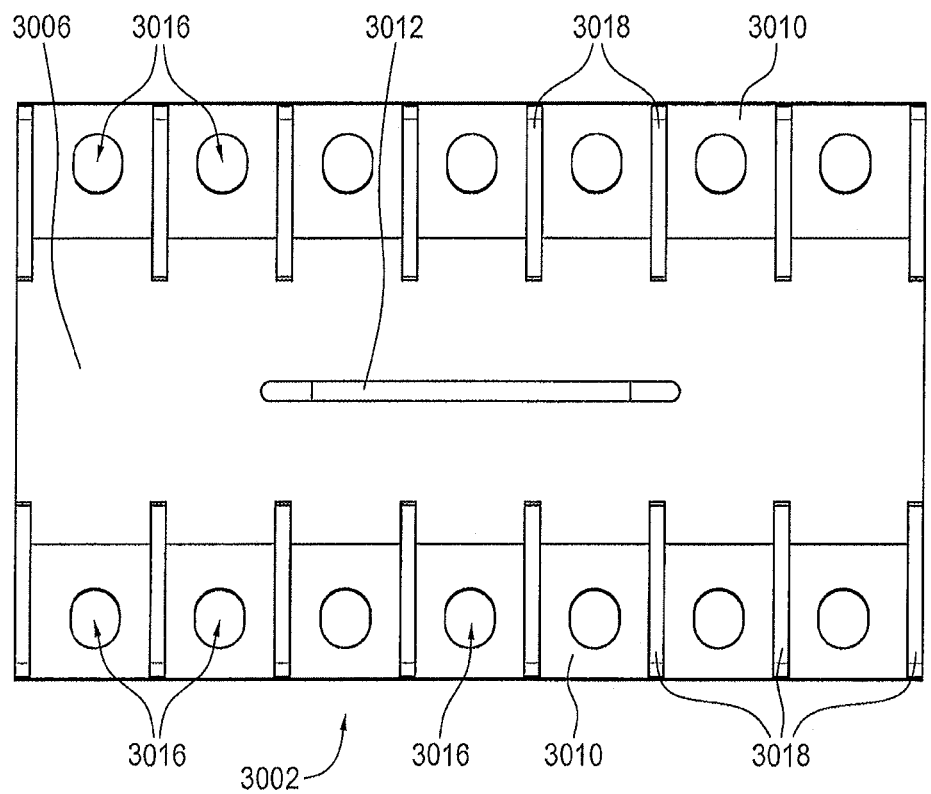
Figure 17A:
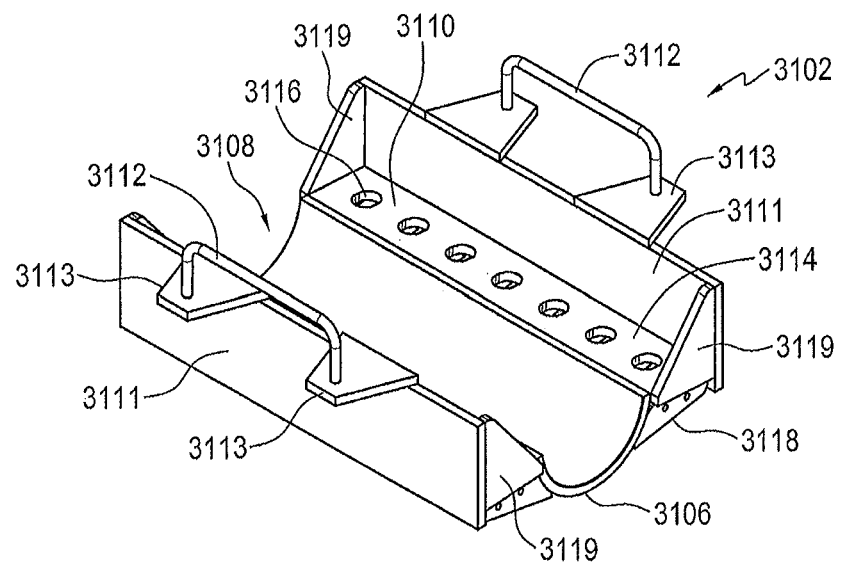
FIGS. 17A, 17B, 17C, 17D, and 17E are a top perspective view, a bottom perspective view, a side view, an end view, and a top view of a base of the pipe clamp shown in FIG. 15.
Figure 17B:
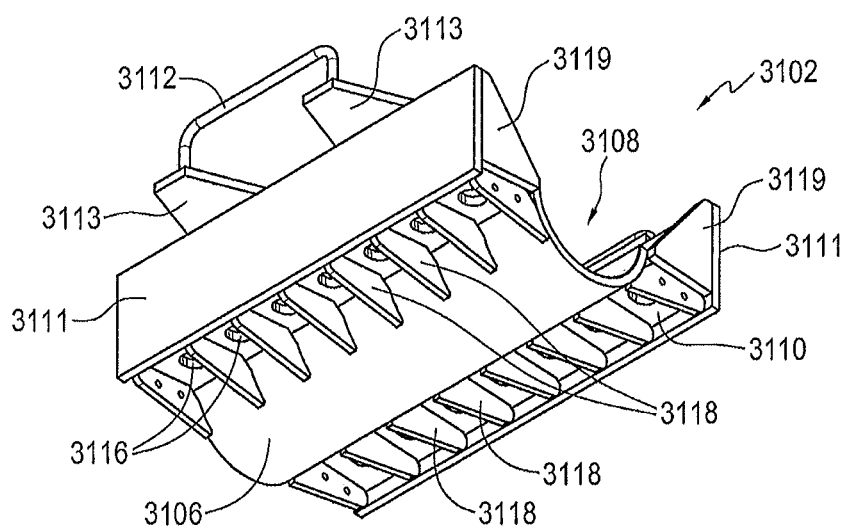
Figure 17C:
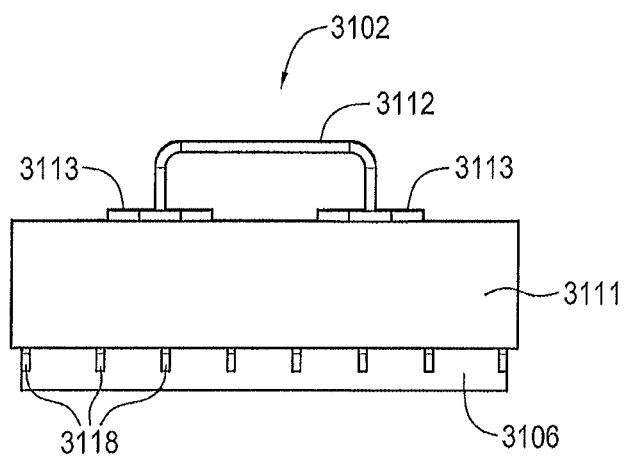
Figure 17D:
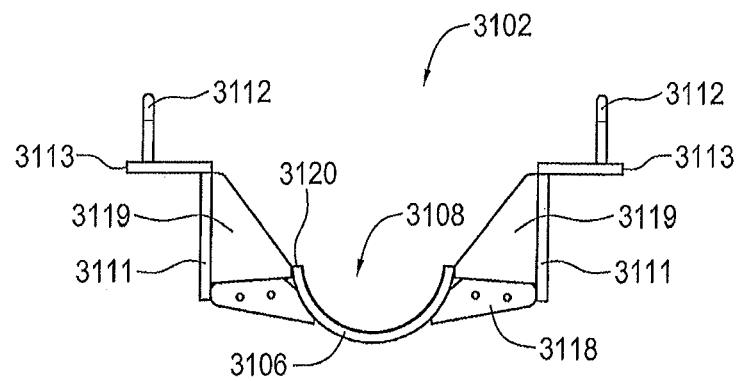
Figure 17E:
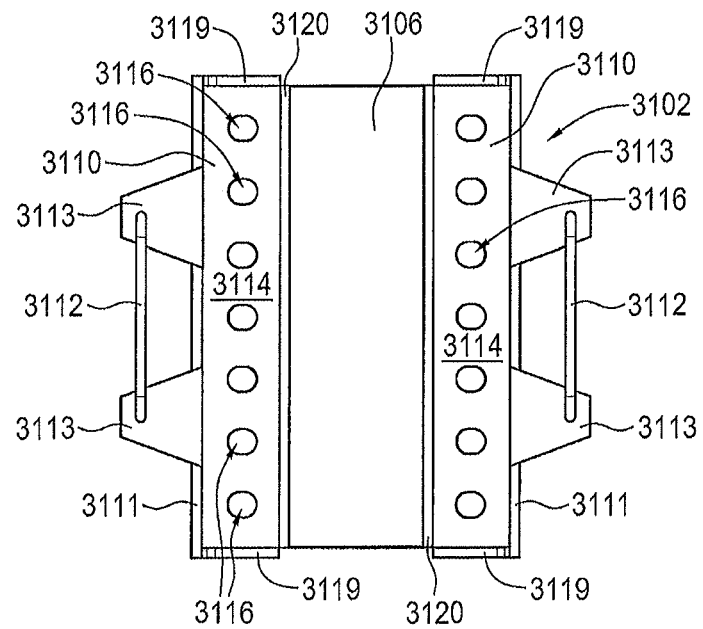
Figure 17F:
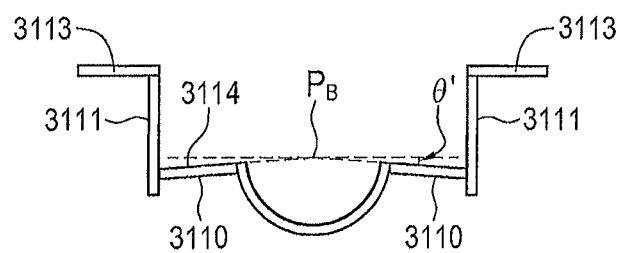
FIG. 17F is an end view of the base with certain parts omitted. These figures are sometimes referred to herein collectively as FIG. 17.

Referring to FIGS. 14H and 14I, the method further comprises cutting back the bell end 2044' axially from the receded end 2003', thereby exposing an extended length of the exposed liner beyond the bell end. While cutting back the bell end, the method may further comprise protecting the liner by placing a cutting shield (not shown) in the annulus. The method further comprises cutting back the exposed liner from its free end to provide an extension 2021 of the liner beyond the bell end of a desired length. Extension 2021 is similar to that shown in FIG. 10B. Extension 1021 may be useful in the embodiments shown in FIGS. 7 and 10.

In one embodiment, the method also comprises securing the pipe with a clamp (not shown) during the expansion of the diameter of the pipe (i.e. during the insertion of the swage 1042).

In one embodiment, a method for forming a pipe end for a pipe having an inner surface lined with a liner is provided herein. The method comprises: cutting the pipe at an axial location to provide a first end having an initial inner diameter defined by an inner surface of the pipe; cutting back the pipe from the first end to define a receded first end and to provide an exposed length of the liner beyond the receded first end; and expanding a diameter of the pipe from first end to form an upset, bell end where an inner diameter of the upset, bell end is larger than the initial diameter, thereby defining an annulus between the inner surface of the pipe and the liner.

The method may further comprise cutting a portion of the exposed length of the liner at its free end to form a cutout therein, prior to expanding the length of the pipe. The cutout extends from the free end to an axial location on an outer surface of the exposed length of the liner. The cutout may be U-shaped, V-shaped, parabola-shaped, hyperbola-shaped, or other general arc-type shape. Alternatively, the cutout may be one or more substantially straight lines, curved lines, irregular lines, or any combination thereof.

The step of expanding the length of the pipe is performed by inserting a thru-bore swage at the receded first end in an axial direction of the pipe.

In a further embodiment, the method further comprises cutting back the upset, bell end axially from the receded first end to expose an extended length of the liner beyond the upset, bell end. The method may further comprise placing a cutting shield in the annulus to protect the liner while cutting back the upset, bell end. The method may further comprise cutting back the extended length of the liner axially from the free end to provide an extension of the liner beyond the upset, bell end.

In a further embodiment, the method comprises securing an outer surface of the pipe with a clamp during the expansion step.

Clamp for Securing Pipe

With reference to FIGS. 15, 16 and 17, a clamp is described herein for securing a pipe section for various operations, including pipe cutting, pipe end forming, pipe connection, etc. The clamp helps limit axial and lateral movements of the pipe during various operations. For example, the clamp helps to restrain the pipe from axial movement during swaging.

A clamp 3000 has a cover section 3002 and a base section 3102. Cover 3002 has an elongated pipe sleeve 3006 having a substantially semi-cylindrical concave inner surface defining an opening 3008 for receiving a portion of an outer surface of a pipe. The inner surface may be textured for engagement with the outer surface of the pipe. For example, the inner surface may include a plurality of grooves extending across the inner surface from one lengthwise side of the sleeve to the other.

Sleeve 3006 has a side flange 3010 extending laterally outwardly from each lengthwise side. Cover 3002 may include a handle 3012 for transporting and handling the cover section. Handle 3012 may be attached to any part of the cover and in the illustrated embodiment the handle is attached to the sleeve 3006.

In one embodiment, side flange 3010 extends along substantially the entire length of the sleeve. Side flange 3010 may be a continuous strip of material. In another embodiment, side flange 3010 comprises a plurality of spaced-apart flange sections intermittently positioned along the lengthwise sides of the sleeve 3006.

Side flange 3010 has a base surface 3014 facing substantially the same direction as the opening 3008. In a preferred embodiment, the base surface is substantially flat and the plane of the base surface is not parallel to the plane $P_C$ of the widest part of the opening 3008. Preferably, the plane of the base surface defines an angle θ relative to plane $P_C$ such that the base surface is tilted slightly away from the direction of the opening. For example, if the cover is placed against a flat surface with its inner surface facing the flat surface, the base surface of the flanges 3010 tilts away from the flat surface such that at least a portion of the base surface is not in physical contact with the flat surface (i.e. there is a wedge-shaped gap between the base surface and the flat surface). Angle θ may range from about 1° to about 5°. In a sample embodiment, angle θ is about 3.7°.

Each lengthwise side of the sleeve 3006 has two ends, an inner edge, and an outer edge, defining a face 3020 therebetween. The inner edges are the edges on the inner surface defining the lengthwise edges of the opening 3008. The outer edges are the lengthwise edges of the sleeve from which the flanges 3010 extend. Preferably, the face of each lengthwise side of sleeve 3006 is slanted from the inner edge to the outer edge in the same direction as the base surface of the flanges (i.e. away from the opening direction of opening 3008). In other words, the plane of face 3020 defines an angle relative to plane $P_C$. The angle between the plane of face 3020 and plane $P_T$ may have be the same as or different from angle θ. In one embodiment, the angle between the plane of face 3020 and plane $P_C$ ranges from about 1° to about 5°. In a sample embodiment, the angle is about 2.61°.

Each flange 3010 has at least one aperture 3016 for receiving a fastener 3200 therethrough. In the illustrated embodiment, each flange 3010 has a plurality of spaced-apart apertures 3016 intermittently positioned along the length of the flange.

Cover 3002 may further include gussets 3018 to provide structural reinforcement for the sleeve and the flanges. For example, each gusset may be connected to the sleeve and one of the flanges, and extending therebetween, as shown in the illustrated embodiment. In a further sample embodiment, a gusset 3018 may be situated between each pair of adjacent apertures 3016 and also at each end of each flange.

Cover 3002 is receivable in base 3012 and/or placeable against base 3012 for connection to the base. Base 3102 has an elongated sleeve 3106 having a substantially semi-cylindrical concave inner surface defining an trough 3108 for receiving a portion of an outer surface of a pipe. Sleeve 3106 has a side flange 3110 extending laterally outwardly from each lengthwise side. Each flange 3110 may include a side wall 3111 at its free lengthwise side. The distance between the side walls 3111 on either side of base 3102 is at least equal to or greater than the width of cover 3002 (i.e. the distance between the free sides of flanges 3010 if the flanges 3010 were on the same plane as plane $P_T$) such that cover 3002 is easily receivable between walls 3111 with the opening facing and substantially aligned with trough 3108.

The inner surface of sleeve 3106 may be textured for engagement with the outer surface of the pipe. For example, the inner surface of sleeve 3016 may include a plurality of grooves extending across the inner surface from one lengthwise side of the sleeve to the other.

Base 3102 may include one or more handles 3112 for transporting and handling the base section. Handle 3112 may be attached to any part of the base as long as open access to the trough and side flanges 3110 is maintained. For example, in the illustrated embodiment the handles 3112 are supported on ledges 3113 that are attached to side walls and extend outwardly therefrom in a direction away from trough 3108.

In one embodiment, side flange 3110 extends along substantially the entire length of the sleeve. Side flange 3110 may be a continuous strip of material. In another embodiment, side flange 3110 comprises a plurality of spaced-apart flange sections intermittently positioned along the lengthwise sides of the sleeve 3106. Similarly, side wall 3111 may or may not be a continuous strip of material. Side wall 3111 may comprise a plurality of spaced-apart wall sections intermittently positioned along the free lengthwise side of flange 3110.

Side flange 3110 has a top surface 3114 facing substantially the same direction as the trough 3108. In a preferred embodiment, the top surface is substantially flat and the plane of the top surface is not parallel to the plane $P_B$ of the widest part of the trough 3108. Preferably, the plane of the top surface defines an angle θ' relative to plane $P_B$ such that the top surface is tilted slightly away from the opening direction of the trough. For example, if the base is placed against a flat surface with its inner surface facing the flat surface, the top surface of the flanges 3110 tilts away from the flat surface at the angle θ', with the free lengthwise sides of flanges 3110 being further away from the flat surface than the lengthwise sides attached to sleeve 3106. Angle θ' may range from about 1° to about 5°. In a sample embodiment, angle θ' is about 3.7°.

Each lengthwise side of the sleeve 3106 has two ends, an inner edge, and an outer edge, defining a face 3120 therebetween. The inner edges are the edges on the inner surface defining the lengthwise edges of trough 3108. The outer edges are the lengthwise edges of the sleeve from which the flanges 3110 extend. Preferably, the face of each lengthwise side of sleeve 3106 is slanted from the inner edge to the outer edge in the same direction as the top surface of the flanges (i.e. away from the opening direction of trough 3108). In other words, the plane of face 3120 defines an angle relative to plane $P_B$. The angle between the plane of face 3120 and plane $P_B$ may have be the same as or different from angle θ'. In one embodiment, the angle between the plane of face 3120 and plane $P_B$ ranges from about 1° to about 5°. In a sample embodiment, the angle is about 2.61°.

Each flange 3110 has at least one aperture 3116 for receiving a fastener 3200 therethrough. In the illustrated embodiment, each flange 3110 has a plurality of spaced-apart apertures 3116 intermittently positioned along the length of the flange.

Base 3102 may further include gussets 3118 to provide structural reinforcement for the sleeve and the flanges. For example, each gusset may be connected to the sleeve and one of the flanges, and extending therebetween, as shown in the illustrated embodiment. In a further sample embodiment, a gusset 3118 may be situated between each pair of adjacent apertures 3116 and also at each end of each flange. Additional gussets 3119 may be included to provide structural reinforcement for the side walls 3111 and the flanges 3110. For example, each gusset 3119 may be connected to one end of the flange and one end of the side wall to reinforce the connection between the two parts.

Preferably, the sleeve and flanges of cover 3002 and those of base 3102 are substantially mirror images of one another along plane $P_C$ or plane $P_B$. When cover 3002 is placed over base 3102 (i.e. with cover 3002 received between side walls 3111 and the inner surfaces of the sleeves facing one another and the lengthwise central axis of the sleeves substantially aligned) the inner surfaces of the sleeves define a bore 3208 in which a pipe can be received.

When cover 3002 is placed over base 3012, the apertures 3016, 3116 of the flanges on each lengthwise side also substantially align such that fasteners 3200, for example nuts and bolts, can be used to connect the cover and the base via the apertures. In the sample illustrated embodiment, as shown in FIG. 15, a bolt 3200 is inserted through each pair of aligned apertures 3016, 3116 of the flanges and is secured with a nut 3202. The nuts 3202 can be screwed towards the bolt heads to exert a force on the surfaces of the flanges opposite top surface 3114 and base surface 3014. Bolt retainers 3204 may be included to hold the bolts 3200 in place and/or prevent any undesired rotation of same.

To secure a pipe in bore 3208, base 3102 is uncovered with open access to trough 3108 and the pipe is placed in trough 3108 with its lengthwise axis substantially aligned with that of sleeve 3106. Cover 3002 is then placed over base 3102 such that a portion of the pipe is received in opening 3008 with the pipe's lengthwise axis substantially aligned with that of sleeve 3006. At least a portion of the outer surface of the pipe is in contact with the inner surface of sleeves 3006 and/or 3106.

Since one or both of (i) faces 3020 and base surfaces 3014; and (ii) faces 3120 and top surfaces 3114 are angled relative to plane $P_C$ or $P_B$, respectively, when cover 3002 is placed over base 3102 only the inner edges of the sleeves, and maybe a portion of the faces near the inner edges, are in physical contact with one another. In other words, when cover 3002 is placed over base 3102, and without any external forces on the cover and base, there is a wedged gap between the flanges of the cover and the flanges of the base.

To connect the cover and the base, fasteners 3200 may be used to clamp together flanges 3010 and 3110, as described above. To close the wedged gap between the flanges (also referred to "pressing" the flanges together), the fasteners are tightened on the flanges until the forces exerted thereon are sufficient to cause the flanges to flex toward one another such that at least a substantial portion of the base and top surfaces on each side are in physical contact.

The flexing of flange 3010 toward flange 3110 in turn causes the lengthwise sides of sleeve 3006 to move towards each other, which slightly narrows the arc of opening 3008, thereby allowing the inner surface of the sleeve to frictionally engage at least a portion of the outer surface of the pipe and exerting a substantially even radially inwardly force thereon. Similarly, the flexing of flange 3110 toward flange 3010 in turn causes the lengthwise sides of sleeve 3106 to move towards each other, which slightly narrows the arc of trough 3108, thereby allowing the inner surface of the sleeve to frictionally engage at least a portion of the outer surface of the pipe and exerting a substantially even radially inwardly force thereon. Therefore, by pressing the flanges of the cover and the base together, the inner surfaces of the sleeves exert a radially inwardly force that is substantially evenly distributed over the outer surface of the pipe to secure the pipe in bore 3208. In contrast, conventional pipe clamps tend to apply forces on certain spots on the pipe, thereby creating areas of concentrated pressures which may cause damage to the pipe.

In an alternative embodiment, the fastener to connect the base and the cover may be an external clamp or vice (not shown) that exerts a force on the surfaces of the flanges opposite top surface 3114 and base surface 3014 to clamp the flanges together. The external clamp or vice applies a force on flanges 3010, 3110 to flex same in order to place base surface 3014 and top surface 3114 in physical contact with one another. In this embodiment, some or all of the gussets, apertures, and side walls may be omitted.

The size and dimensions of the cover, base, opening of the cover, and trough of the base may vary depending on the size of the pipe to be secured by the clamp. Preferably, the opening of the cover and the trough of the base are sized such that a pipe can be held snugly therebetween when the cover and the base are fastened together, as discussed above.

Preferably, the cover and base are made of materials that have sufficient structural integrity and strength to withstand the loads associated with securing the outer surface of a pipe and also enough elasticity to allow the flanges and bodies to flex slightly, without damage to the clamp. For example, the clamp may be made of alloy steel with a yield strength greater than about 75,000 psi.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A method for forming a pipe end for a pipe having an inner surface lined with a liner, the method comprises:
    cutting the pipe at an axial location to provide a first end having an initial inner diameter defined by an inner surface of the pipe;
    cutting back the pipe from the first end to define a receded first end and to provide an exposed length of the liner beyond the receded first end; and
    expanding a diameter of the pipe from the receded first end to form an upset, bell end where an inner diameter of the upset, bell end is larger than the initial diameter, thereby defining an annulus between the inner surface of the pipe and the liner.

2. The method of claim 1, wherein expanding the diameter of the pipe is performed by inserting a thru-bore swage at the receded first end in an axial direction of the pipe.

3. The method of claim 1, further comprising cutting a portion of the exposed length of the liner at a free end of the liner to form a cutout therein, prior to expanding the diameter of the pipe.

4. The method of claim 3, wherein the cutout extends from the free end to an axial location on an outer surface of the exposed length of the liner.

5. The method of claim 3, wherein the cutout is U-shaped, V-shaped, parabola-shaped, hyperbola-shaped, or an arc-type shape.

6. The method of claim 3, wherein the cutout comprises one or more substantially straight lines, curved lines, or irregular lines, or any combination thereof.

7. The method of claim 1, further comprising cutting of an end portion of the upset, bell end to expose a further length of the liner beyond the upset, bell end.

8. The method of claim 7, further comprising placing a cutting shield in the annulus to protect the liner while cutting the upset, bell end.

9. The method of claim 7, further comprising cutting back the further length of the liner axially from the free end to provide an extension of the liner beyond the upset, bell end.

10. The method of claim 1, further comprising securing an outer surface of the pipe with a clamp while expanding the diameter of the pipe.

* * * * *